(12) United States Patent
Yukawa et al.

(10) Patent No.: US 11,511,735 B2
(45) Date of Patent: Nov. 29, 2022

(54) SIGNAL PROCESSING APPARATUS AND SIGNAL PROCESSING METHOD

(71) Applicant: SONY CORPORATION, Tokyo (JP)

(72) Inventors: Yasuhiro Yukawa, Kanagawa (JP); Noriko Tanaka, Tokyo (JP); Asako Kaneko, Tokyo (JP)

(73) Assignee: SONY CORPORATION, Tokyo (JP)

( * ) Notice: Subject to any disclaimer, the term of this patent is extended or adjusted under 35 U.S.C. 154(b) by 229 days.

(21) Appl. No.: 16/955,471

(22) PCT Filed: Dec. 12, 2018

(86) PCT No.: PCT/JP2018/045615
§ 371 (c)(1),
(2) Date: Jun. 18, 2020

(87) PCT Pub. No.: WO2019/131121
PCT Pub. Date: Jul. 4, 2019

(65) Prior Publication Data
US 2020/0369266 A1     Nov. 26, 2020

(30) Foreign Application Priority Data

Dec. 26, 2017    (JP) .............................. JP2017-249549

(51) Int. Cl.
*B60W 30/09*        (2012.01)
*B60W 30/095*     (2012.01)
(Continued)

(52) U.S. Cl.
CPC ........ *B60W 30/09* (2013.01); *B60W 30/0956* (2013.01); *B60W 30/16* (2013.01);
(Continued)

(58) Field of Classification Search
CPC .... G08G 1/0112; G08G 1/0141; G08G 1/017; G08G 1/0175; G08G 1/04;
(Continued)

(56) References Cited

U.S. PATENT DOCUMENTS

2016/0257342 A1    9/2016   Ueda et al.
2016/0318490 A1*   11/2016   Ben Shalom ............. B60T 7/18
(Continued)

FOREIGN PATENT DOCUMENTS

CA         2790378 A1 *   3/2013  ............. G06Q 10/06
CN        104346624 A      2/2015
(Continued)

OTHER PUBLICATIONS

Hsu, et al.; A path planning achievement of car following in motion control via LiDAR sensing; Jun. 17, 2010; https://iq.ip.com/npl/IEEE/5514860 (Year: 2010).*

(Continued)

*Primary Examiner* — Atul Trivedi
(74) *Attorney, Agent, or Firm* — Chip Law Group

(57) ABSTRACT

There is provided a signal processing apparatus, a signal processing method for appropriate driving control. The signal processing apparatus includes a safety determination unit that determines safety of a preceding vehicle on a basis of sensor-related information related to a sensor provided in the preceding vehicle, the sensor being relevant to a safety function, and a control signal generation unit that generates, on a basis of a result of the determination of the safety, a control signal for controlling a host vehicle.

15 Claims, 12 Drawing Sheets

(51) Int. Cl.
*B60W 30/16* (2020.01)
*B60W 50/14* (2020.01)
*G08G 1/017* (2006.01)
*G08G 1/16* (2006.01)

(52) U.S. Cl.
CPC ............ *B60W 50/14* (2013.01); *G08G 1/017* (2013.01); *G08G 1/16* (2013.01); *B60W 2420/42* (2013.01); *B60W 2420/52* (2013.01); *B60W 2420/54* (2013.01); *B60W 2554/80* (2020.02)

(58) Field of Classification Search
CPC ....... G08G 1/096716; G08G 1/096741; G08G 1/09675; G08G 1/096791; G08G 1/16; G08G 1/166; B60W 30/09; B60W 30/0956; B60W 30/16; B60W 2420/42; B60W 2420/52; B60W 2420/54; B60W 50/14; B60W 2554/80; G06V 20/56; G01S 15/931; G01S 17/86; G01S 17/931; G01S 13/862; G01S 13/865; G01S 13/867; G01S 13/87; G01S 13/931
USPC .......................................................... 701/70
See application file for complete search history.

(56) References Cited

U.S. PATENT DOCUMENTS

| | | | |
|---|---|---|---|
| 2016/0318523 A1* | 11/2016 | Kim | B60R 1/00 |
| 2016/0379486 A1* | 12/2016 | Taylor | G08G 1/08 340/905 |
| 2017/0001650 A1* | 1/2017 | Park | B60W 50/08 |
| 2017/0036673 A1* | 2/2017 | Lee | A61B 5/165 |
| 2017/0050641 A1* | 2/2017 | Park | B60Q 1/44 |
| 2017/0054842 A1* | 2/2017 | Choi | H04W 4/021 |
| 2017/0060234 A1* | 3/2017 | Sung | G06F 3/147 |
| 2017/0061219 A1* | 3/2017 | Shin | G06V 20/58 |
| 2017/0240185 A1* | 8/2017 | Li | G08B 7/06 |
| 2017/0267238 A1* | 9/2017 | Mimura | B60W 30/182 |
| 2017/0267244 A1* | 9/2017 | Kim | B60W 10/182 |
| 2017/0305418 A1* | 10/2017 | Bae | G08G 1/166 |
| 2017/0310827 A1* | 10/2017 | Mehta | H04M 11/04 |
| 2017/0334441 A1* | 11/2017 | Sen | G05D 1/0223 |
| 2017/0337813 A1* | 11/2017 | Taylor | G05D 1/0285 |
| 2019/0154439 A1* | 5/2019 | Binder | G01B 11/26 |

FOREIGN PATENT DOCUMENTS

| | | | | |
|---|---|---|---|---|
| CN | 106461406 A | | 2/2017 | |
| JP | 2006-172053 A | | 6/2006 | |
| JP | 2011-203053 A | | 10/2011 | |
| JP | 2014-182007 A | | 9/2014 | |
| JP | 2015-044432 A | | 3/2015 | |
| JP | 2016-162196 A | | 9/2016 | |
| JP | 2017-191551 A | | 10/2017 | |
| WO | WO-2015160859 A1 | * | 10/2015 | ......... G06Q 30/0207 |

OTHER PUBLICATIONS

Office Action for CN Patent Application No. 201880082211.0, dated Jan. 6, 2022, 11 pages of English Translation and 09 pages of Office Action.

International Search Report and Written Opinion of PCT Application No. PCT/JP2018/045615, dated Feb. 12, 2019, 09 pages of ISRWO.

* cited by examiner

SIGNAL PROCESSING APPARATUS AND SIGNAL PROCESSING METHOD

CROSS REFERENCE TO RELATED APPLICATIONS

This application is a U.S. National Phase of International Patent Application No. PCT/JP2018/045615 filed on Dec. 12, 2018, which claims priority benefit of Japanese Patent Application No. JP 2017-249549 filed in the Japan Patent Office on Dec. 26, 2017. Each of the above-referenced applications is hereby incorporated herein by reference in its entirety.

TECHNICAL FIELD

The present technology relates to a signal processing apparatus, a signal processing method, and a program, and particularly, to a signal processing apparatus, a signal processing method, and a program that enable more appropriate control.

BACKGROUND ART

In the past, an ADAS (Advanced Driving Assistant System) function is known. The ADAS function is a function that assists driving of automobiles.

In a case where an automobile has the ADAS function, various kinds of controls such as a collision warning, following, and emergency braking are performed on the basis of the distance between the host vehicle and a preceding vehicle ahead of the host vehicle and the like.

Further, for example, as a technique related to automobile driving control, a technique proposed (e.g., see PTL 1) changes the mode of automatic driving of a host vehicle depending on whether a surrounding vehicle in the surroundings of the host vehicle is driven manually or automatically. With this technique, for example, in a case where a vehicle ahead as the surrounding vehicle is driven manually, the following distance between the vehicle ahead and the host vehicle is set to be greater.

CITATION LIST

Patent Literature

[PTL 1]
Japanese Patent Laid-Open No. 2015-44432

SUMMARY

Technical Problems

Incidentally, in order to ensure safety, the driving assistance using ADAS requires appropriate control of driving and the like. However, the above-described technique has room for improvement to achieve more appropriate control.

For example, the driving assistance using ADAS uses the distance between the host vehicle and a surrounding vehicle such as a preceding vehicle or a rear vehicle, the distance from the host vehicle to an obstacle, and the like. These distances are measured by a distance detection sensor.

However, there are many types of distance detection sensors available. Mutually different sensors have distance detection capabilities that are superior or inferior to one another. On top of that, superiority or inferiority of the distance detection capabilities to one another changes depending on the situations (environments) when the sensors are used, that is, when distance measurement is performed. However, since the above-described technique does not take into account the fact that the distance detection capabilities vary depending on the types of the sensors and the situations when distance measurement is performed, it cannot be said that optimal control is performed as control of driving and the like for driving assistance.

The present technology has been made in view of the above-described circumstances and enables more appropriate control.

Solution to Problems

A signal processing apparatus according to one aspect of the present technology includes: a safety determination unit configured to determine safety of a preceding vehicle on a basis of sensor-related information related to a sensor provided in the preceding vehicle, the sensor being relevant to a safety function; and a control signal generation unit configured to generate, on a basis of a result of the determination of the safety, a control signal for controlling a host vehicle.

A signal processing method or a program according to one aspect of the present technology includes the steps of determining safety of a preceding vehicle on a basis of sensor-related information related to a sensor provided in the preceding vehicle, the sensor being relevant to a safety function; and generating, on a basis of a result of the determination of the safety, a control signal for controlling a host vehicle.

In one aspect of the present technology, safety of a preceding vehicle is determined on a basis of sensor-related information related to a sensor provided in the preceding vehicle, the sensor being relevant to a safety function. On a basis of a result of the determination of the safety, a control signal for controlling a host vehicle is generated.

Advantageous Effect of Invention

According to one aspect of the present technology, it is possible to perform more appropriate control.

It is noted that the effect described herein are not necessarily limited and any of the effects described in the present disclosure may be provided.

DESCRIPTION OF EMBODIMENTS

Figure 1:
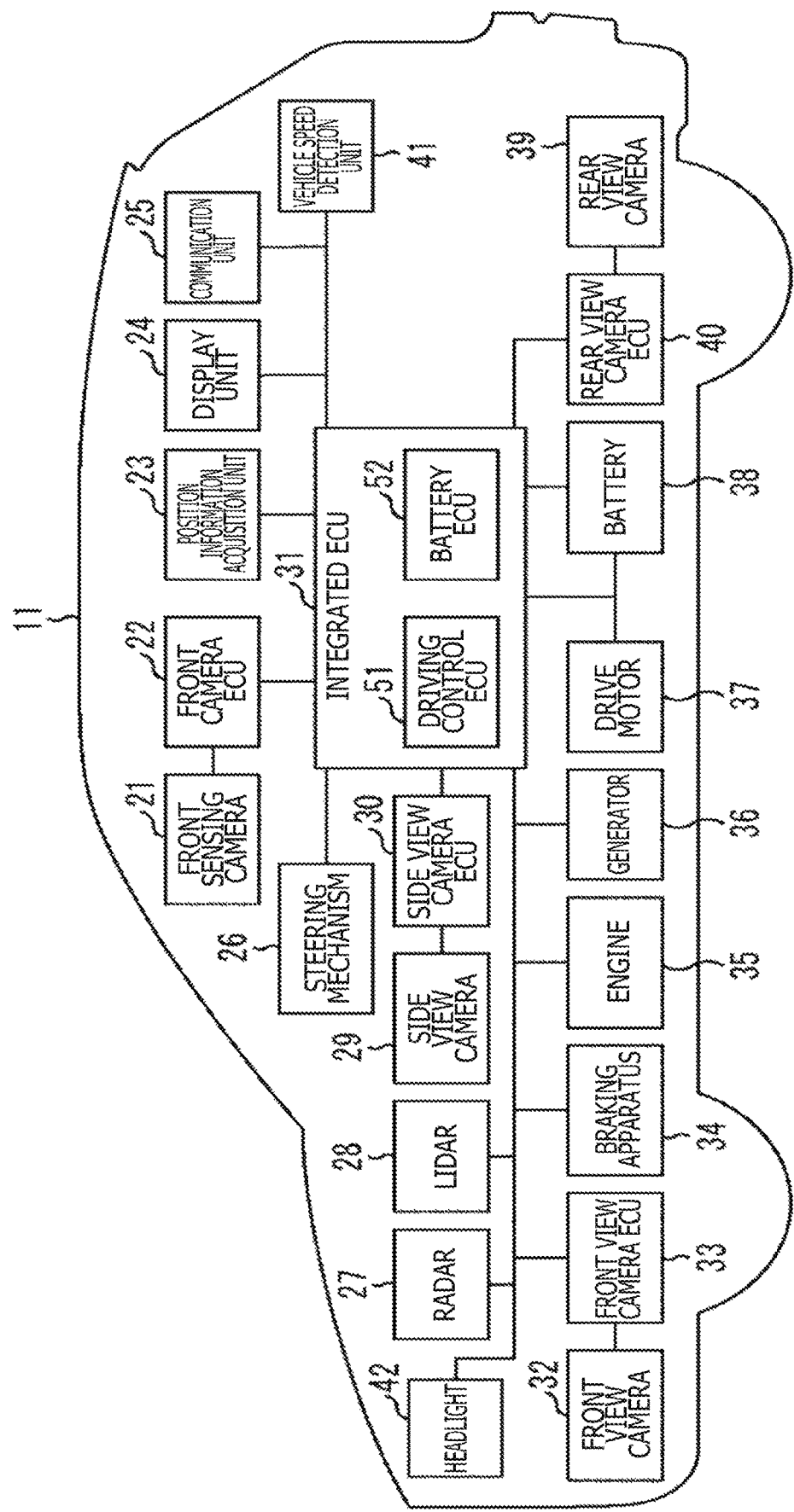
FIG. 1 is a diagram illustrating an example of a configuration of a vehicle.

Hereinafter, embodiments to which the present technology is applied will be described with reference to the drawings.

First Embodiment

<Example of Configuration of Vehicle>

In the present technology, concerning a surrounding vehicle, which is a vehicle traveling in the surroundings of a host vehicle, sensor-related information related to a sensor that is relevant to a safety function such as distance measurement and that is provided in the surrounding vehicle is acquired and control signals for controlling driving and the like of the host vehicle are generated on the basis of the sensor-related information. With this configuration, it is possible to more appropriately control driving and the like of the host vehicle in consideration of the capability of the sensor of the surrounding vehicle and the like.

For example, in a case where a preceding vehicle brakes hard, the host vehicle also brakes hard under driving assistance using ADAS. However, a contingency that does not normally occur may possibly occur in a situation where hard braking is performed. Therefore, it is desirable to avoid hard braking as much as possible.

As described above, the capabilities of sensors relevant to safety functions change depending not only on the types of the sensors themselves but also on the surrounding environments such as the weather, that is, the situations when the sensors are used.

Therefore, for example, in a case where the capability of a sensor itself of the preceding vehicle is low, or in a case where the capability of the sensor is reduced due to the situation (environment), the safety of the preceding vehicle decreases and there is a possibility that the preceding vehicle brakes hard. Therefore, the host vehicle is required to take measures such as keeping a sufficient following distance from the preceding vehicle. In view of the foregoing, the present technology enables more appropriate control by determining the safety of the preceding vehicle on the basis of sensor-related information related to the sensor of the preceding vehicle and changing, for example, the following distance according to the result of the determination. Accordingly, the safety of the host vehicle can be improved.

It is noted that control corresponding to the result of the determination of the safety is not limited to the setting of the following distance and may be any control such as the setting of a timing for braking hard, the selection of a vehicle to follow when following is performed, or a timing for outputting a collision warning.

Further, the sensor-related information is not limited to information related to the capability of a sensor and may be information obtained by the sensor, or the like. Safety may be determined using not only the sensor-related information of the surrounding vehicle but also the sensor-related information of the host vehicle and environment information indicating the environment such as the weather.

As an example, the safety of the preceding vehicle can be determined by acquiring an image captured by the sensor of the preceding vehicle and analyzing the image acquired from the preceding vehicle in the host vehicle, for example. In this case, it is possible to perform control such as increasing the following distance from the preceding vehicle more than usual or braking hard on the basis of the result of the determination of the safety.

Now, a more specific embodiment to which the present technology is applied will be described below.

It is noted that although the following description will be given of a case where the present technology is applied to a passenger car (automobile) as a vehicle, the present technology can be applied to not only automobiles such as electric vehicles and hybrid electric vehicles, but also moving objects such as motorcycles, bicycles, electric wheelchairs, personal mobilities, airplanes, ships, and robots.

FIG. 1 is a diagram illustrating an example of a configuration of an embodiment of a vehicle to which the present technology is applied.

A vehicle 11 illustrated in FIG. 1 includes a front sensing camera 21, a front camera ECU (Electronic Control Unit) 22, a position information acquisition unit 23, a display unit 24, a communication unit 25, a steering mechanism 26, a radar 27, a lidar 28, a side view camera 29, a side view camera ECU 30, an integrated ECU 31, a front view camera 32, a front view camera ECU 33, a braking apparatus 34, an engine 35, a generator 36, a drive motor 37, a battery 38, a rear view camera 39, a rear view camera ECU 40, a vehicle speed detection unit 41, and a headlight 42.

The individual units provided in the vehicle 11 are interconnected to each other via a CAN (Controller Area Network) communication bus, other connection lines, and the like. However, here, the bus and connection lines are depicted without particularly distinguishing from each other in order to make the figure easier to see.

The front sensing camera 21 includes, for example, a sensing-dedicated camera disposed in the vicinity of a rearview mirror inside the vehicle. The front sensing camera 21 captures an image of the front of the vehicle 11 as the subject and outputs a resulting sensing image to the front camera ECU 22.

The front camera ECU 22 appropriately performs a process of improving the image quality or the like on the sensing image supplied from the front sensing camera 21 and then performs image recognition on the sensing image, thereby detecting any objects such as a white line and a pedestrian from the sensing image. The front camera ECU 22 outputs the result of the image recognition to the CAN communication bus.

The position information acquisition unit 23 includes, for example, a position information measurement system such as a GPS (Global Positioning System). The position information acquisition unit 23 detects the position of the vehicle 11 and outputs position information indicating the result of the detection to the CAN communication bus.

The display unit 24 includes, for example, a liquid crystal display panel or the like and is disposed at a predetermined position inside the vehicle such as a center portion of an instrument panel or the inside of the rearview mirror. Further, the display unit 24 may be a transmissive display provided so as to be superimposed on a windshield section, or may be the display of a car navigation system. The display unit 24 displays various kinds of images according to the control of the integrated ECU 31.

The communication unit 25 transmits and receives information to and from a surrounding vehicle, a mobile terminal apparatus possessed by a pedestrian, a roadside device, an external server, or the like through various kinds of wireless communication such as vehicle-to-vehicle communication, vehicle-to-pedestrian communication, and vehicle-to-infrastructure communication. For example, the communication unit 25 performs vehicle-to-vehicle communication with a surrounding vehicle to receive, for example, sensor-related information related to a sensor that is relevant to a safety function of the surrounding vehicle from the surrounding vehicle, and supplies the sensor-related information and the like to the integrated ECU 31.

The steering mechanism 26 controls the traveling direction of the vehicle 11, that is, performs steering angle control, according to the driver's steering wheel operation or control signals supplied from the integrated ECU 31. The radar 27 is a distance measurement sensor that measures the distance to an object such as a vehicle or a pedestrian in each direction such as forward and backward by using electromagnetic waves such as millimeter waves, and outputs the result of the measurement of the distance to the object to the integrated ECU 31 or the like. The lidar 28 is a distance measurement sensor that measures the distance to an object such as a vehicle or a pedestrian in each direction such as forward and backward by using light waves, and outputs the result of the measurement of the distance to the object to the integrated ECU 31 or the like.

The side view camera 29 is, for example, a camera disposed in a casing of a side mirror or in the vicinity of the side mirror. The side view camera 29 captures an image of the side (hereinafter also referred to as a side image) of the vehicle 11 including an area to be the driver's blind spot and supplies the image to the side view camera ECU 30.

The side view camera ECU 30 performs an image process for improving the image quality such as white balance adjustment on the side image supplied from the side view camera 29 and supplies the obtained side image to the integrated ECU 31 via a cable different from the CAN communication bus.

The integrated ECU 31 includes a plurality of ECUs, such as a driving control ECU 51 and a battery ECU 52, disposed at the center of the vehicle 11 and controls the operation of the entire vehicle 11.

For example, the driving control ECU 51 is an ECU that implements an ADAS function or an autonomous driving (Self driving) function, and controls driving (traveling) of the vehicle 11 on the basis of various kinds of information such as the result of image recognition from the front camera ECU 22, the position information from the position information acquisition unit 23, the sensor-related information supplied from the communication unit 25, the results of the measurement from the radar 27 and the lidar 28, the result of detection of the vehicle speed from the vehicle speed detection unit 41, and the like. That is, the driving control ECU 51 control driving of the vehicle 11 by controlling the steering mechanism 26, the braking apparatus 34, the engine 35, the drive motor 37, and the like. Further, the driving control ECU 51 controls beam irradiation of the headlight 42 such as switching between a high beam and a low beam by controlling the headlight 42 on the basis of on or off of a headlight of an oncoming vehicle or the like supplied as the result of image recognition from the front camera ECU 22.

It is noted that in the integrated ECU 31, a dedicated ECU may be provided for each of the functions such as the ADAS function, the autonomous driving function, and the beam control.

Further, the battery ECU 52 controls power supply and the like by the battery 38.

The front view camera 32 includes, for example, a camera disposed in the vicinity of a front grille. The front view camera 32 captures an image of the front (hereinafter also referred to as a front image) of the vehicle 11 including an area to be the driver's blind spot and supplies the image to the front view camera ECU 33.

The front view camera ECU 33 performs an image process for improving the image quality such as white balance adjustment on the front image supplied from the front view camera 32, and supplies the obtained front image to the integrated ECU 31 via a cable different from the CAN communication bus.

The braking apparatus 34 operates according to the driver's braking operation or control signals supplied from the integrated ECU 31 to stop or decelerate the vehicle 11. The engine 35 is a power source of the vehicle 11 and is driven according to control signals supplied from the integrated ECU 31.

The generator 36 is controlled by the integrated ECU 31 and generates power according to driving of the engine 35. The drive motor 37 is a power source of the vehicle 11. The drive motor 37 receives power supply from the generator 36 or the battery 38 and is driven according to control signals supplied from the integrated ECU 31. It is noted that the integrated ECU 31 appropriately switches whether to drive the engine 35 or the drive motor 37 during traveling of the vehicle 11.

The battery 38 includes, for example, a battery of 12 V, a battery of 200 V, or the like and supplies power to each unit of the vehicle 11 according to the control of the battery ECU 52.

The rear view camera 39 includes, for example, a camera disposed in the vicinity of a license plate of a tailgate. The rear view camera 39 captures an image of the rear side (hereinafter also referred to as a rear image) of the vehicle 11 including an area to be the driver's blind spot and supplies the image to the rear view camera ECU 40. For example, the rear view camera 39 is activated when a shift lever, not illustrated, is moved to a reverse (R) position.

The rear view camera ECU 40 performs an image process for improving the image quality such as white balance adjustment on the rear image supplied from the rear view camera 39 and supplies the obtained rear image to the integrated ECU 31 via a cable different from the CAN communication bus.

The vehicle speed detection unit 41 is a sensor that detects the vehicle speed of the vehicle 11, and supplies the result of the detection of the vehicle speed to the integrated ECU 31. It is noted that the vehicle speed detection unit 41 may calculate acceleration or the differential of the acceleration from the result of the detection of the vehicle speed. The calculated acceleration is used to, for example, estimate the time until the vehicle 11 collides with an object.

The headlight 42 operates according to control signals supplied from the integrated ECU 31 and illuminates the front of the vehicle 11 by outputting a beam.

<Example of Functional Configuration of Vehicle>

Figure 2:
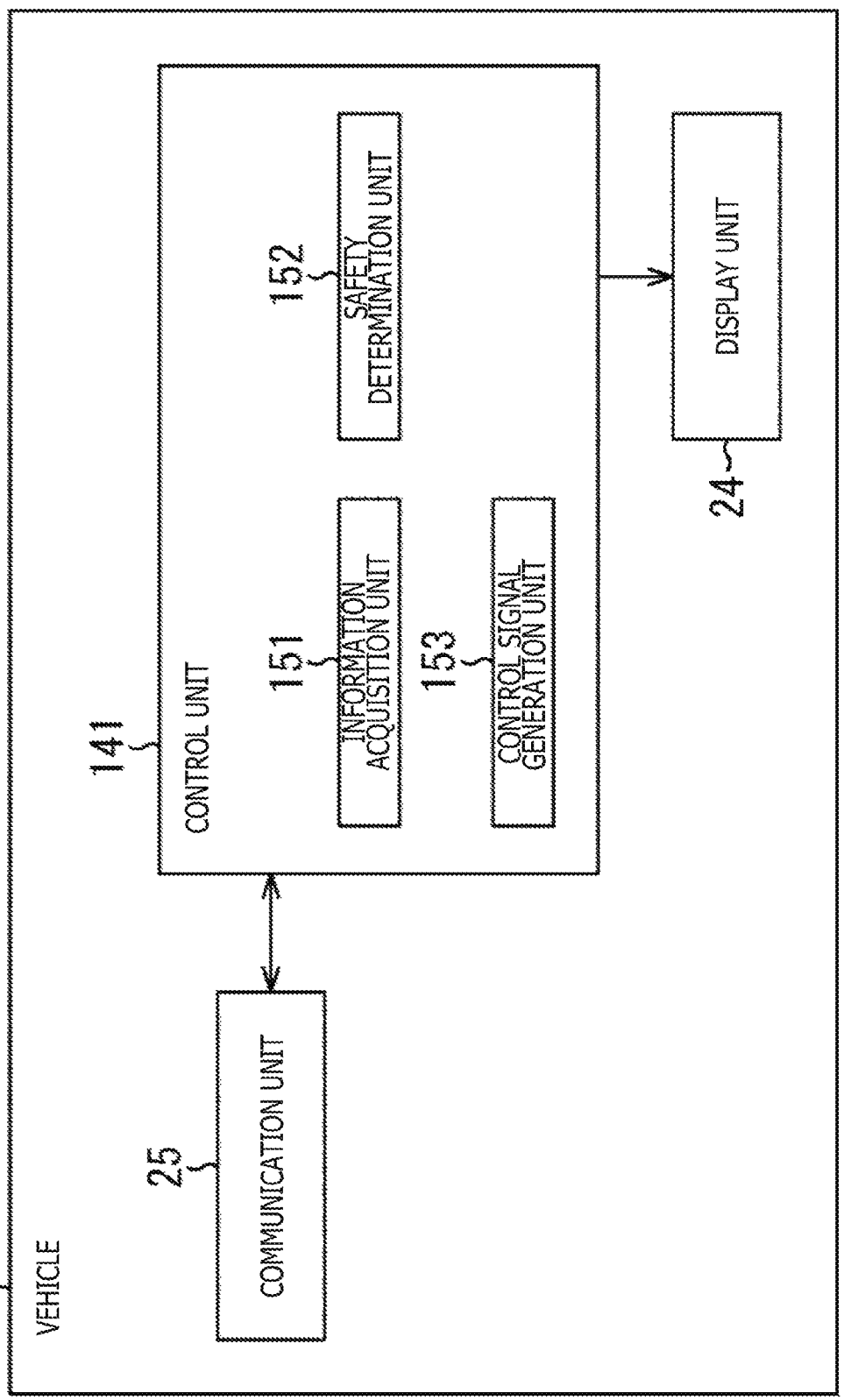
FIG. 2 is a diagram illustrating an example of a functional configuration of the vehicle.

Next, a description will be given of an example of a functional configuration that allows the vehicle 11 illustrated in FIG. 1 to control driving (traveling) and the like of the vehicle 11 using the ADAS function or the like on the basis of sensor-related information of a surrounding vehicle. FIG. 2 is a diagram illustrating the example of the functional configuration of the vehicle 11 for such a case. It is noted that in FIG. 2, parts corresponding to those in FIG. 1 are denoted by the same reference signs, and the description thereof is omitted as appropriate.

The vehicle 11 illustrated in FIG. 2 includes the communication unit 25, a control unit 141, and the display unit 24 and functions as a signal processing apparatus that controls driving and the like of the vehicle 11.

The communication unit 25 communicates with a surrounding vehicle or a server to receive information transmitted from the surrounding vehicle or the server and supply the information to the control unit 141 or to transmit information supplied from the control unit 141 to the surrounding vehicle or the server.

For example, the communication unit 25 receives sensor-related information from a surrounding vehicle by performing vehicle-to-vehicle communication with the surrounding vehicle and supplies the sensor-related information to the control unit 141 or receives environment information from the server and supplies the environment information to the control unit 141.

It is noted that the sensor-related information of the surrounding vehicle is information related to a sensor that is relevant to a safety function of the surrounding vehicle. Here, the sensor-related information is assumed to include at least one of equipment information or sensor output information. The equipment information is information related to the sensor itself. The sensor output information is obtained by the sensor and output from the sensor.

For example, the equipment information is information including sensor type information, sensor capability information, and the like. The sensor type information indicates the type (category) of the sensor relevant to the safety function. The sensor capability information is related to the capability of the sensor relevant to the safety function.

Specifically, the sensor type information is information indicating the type of the sensor relevant to the safety function, such as a millimeter-wave radar, a lidar, a stereo camera, a monocular camera, or an ultrasonic distance sensor, for example.

Further, the sensor capability information is information indicating the capability of the sensor, such as the distance that can be measured by the sensor relevant to the safety function, that is, a measurable distance range, the distance resolution at the time of distance measurement, and sensitivity such as ISO sensitivity when the stereo camera or the monocular camera captures an image.

In addition, the equipment information may include information indicating the time (date and time) of manufacture of the sensor relevant to the safety function, information indicating the time of installation of the sensor relevant to the safety function in the vehicle, and the like.

Further, hereinafter, any sensor relevant to the safety function such as a distance measurement sensor or an image sensor for obtaining image information in the surroundings of the vehicle 11 will also be particularly referred to as a safety-function sensor. For example, in the example illustrated in FIG. 1, the front sensing camera 21, the radar 27, the lidar 28, the side view camera 29, the front view camera 32, the rear view camera 39, the vehicle speed detection unit 41, and the like are safety-function sensors.

It is noted that any sensor may be used as the safety-function sensor as long as the sensor is used for a safety-related function (application). In the following description, the safety-function sensor is assumed to be one of a stereo camera, a monocular camera, a radar such as a millimeter-wave radar, LiDAR (Light Detection and Ranging), and an ultrasonic distance sensor.

Moreover, the sensor output information is information output from the safety-function sensor, that is, information indicating the sensing result of the safety-function sensor. Examples include distance information, which is the result of distance measurement performed by the safety-function sensor, an image (image information) captured by the safety-function sensor, and the like.

Particularly, hereinafter, an image captured by the safety-function sensor, which serves as the sensor output information, will also be referred to as a sensor output image.

For example, in the example illustrated in FIG. 1, a sensing image captured by the front sensing camera 21, a side image captured by the side view camera 29, a front image captured by the front view camera 32, a rear image captured by the rear view camera 39, and the like are sensor output images. It is noted that, for example, the result of image recognition or the like obtained by the front camera ECU 22 performing image recognition on a sensing image obtained by the front sensing camera 21 may serve as the sensor output information.

Further, the environment information is information indicating the environment in the surroundings of the vehicle 11, such as the current weather such as sunny or rainy weather in the surroundings of the vehicle 11, the current time period (time) such as noon or night, and brightness in the surroundings of the vehicle 11. The environment information is also information indicating the environment of not only the vehicle 11 but also the surrounding vehicle in the surroundings of the vehicle 11.

For example, the control unit 141 is implemented by the integrated ECU 31, particularly, the driving control ECU 51, illustrated in FIG. 1 and performs a driving control process for controlling driving and the like of the vehicle 11. The control unit 141 includes an information acquisition unit 151, a safety determination unit 152, and a control signal generation unit 153.

The information acquisition unit 151 appropriately controls the communication unit 25 to acquire various kinds of information such as the sensor-related information of the surrounding vehicle, sensor-related information of the safety-function sensor of the host vehicle, that is, the vehicle 11 itself, and the environment information. It is noted that hereinafter, the vehicle 11 itself will also be referred to as the host vehicle.

The safety determination unit 152 determines the safety of the surrounding vehicle on the basis of at least the sensor-related information of the surrounding vehicle among the sensor-related information of the surrounding vehicle, the sensor-related information of the host vehicle, or the environment information that have been acquired by the information acquisition unit 151. The surrounding vehicle herein refers to a vehicle in the surroundings of the vehicle 11.

The control signal generation unit 153 generates and outputs control signals for controlling the operation of each unit of the vehicle 11 such as the steering mechanism 26, the braking apparatus 34, the engine 35, the drive motor 37, the headlight 42, and the display unit 24 on the basis of the result of the determination of the safety obtained by the safety determination unit 152.

On the basis of the control signals supplied from the control signal generation unit 153, the display unit 24 displays an image and the like such as display of various kinds of warnings that correspond to the control signals.

<About Determination of Safety>

Here, an example of the safety determination performed by the safety determination unit 152 will be described.

Here, a description will be particularly given of a case, as an example, where the safety-function sensor is a distance measurement sensor that measures the distance from the safety-function sensor itself to a vehicle or an obstacle ahead of the safety-function sensor.

For example, as safety-function sensors, a millimeter-wave radar with a millimeter-wave frequency of 76 GHz used for distance measurement (hereinafter referred to as a millimeter-wave radar (76 GHz)), a millimeter-wave radar with a millimeter-wave frequency of 24 GHz used for distance measurement (hereinafter referred to as a millimeter-wave radar (24 GHz)), a stereo camera, a monocular camera, a lidar, and an ultrasonic distance sensor are assumed to be available.

Figure 3:
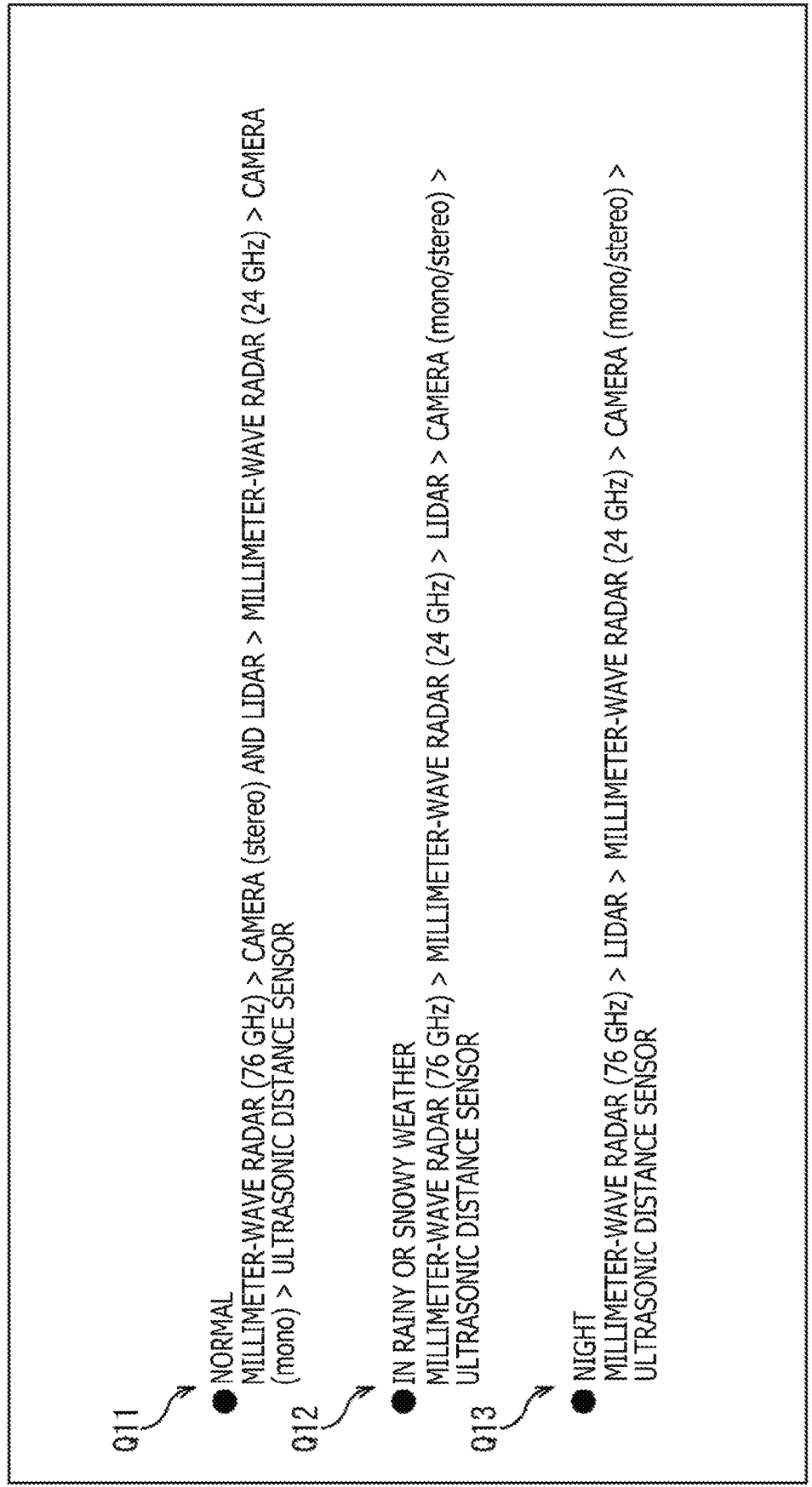
FIG. 3 is a diagram for describing determination of capabilities and safety of safety-function sensors.

In this case, superiority or inferiority of distance measurement capabilities to one another among the safety-function sensors in each weather and time period is as illustrated in FIG. 3. It is noted that in FIG. 3, "camera (stereo)" represents a stereo camera, while "camera (mono)" represents a monocular camera.

For example, in normal times such as when the time period is at noon and the weather is sunny, as indicated by an arrow Q11, the capability, that is, the distance detection capability of the millimeter-wave radar (76 GHz) at the time of distance measurement is the highest, and the capabilities of the stereo camera and the lidar are the second highest after the millimeter-wave radar (76 GHz).

Further, the capability of the millimeter-wave radar (24 GHz) is the next highest after the stereo camera and the lidar, and the capability of the monocular camera is the next highest after the millimeter-wave radar (24 GHz). The capability of the ultrasonic distance sensor is the lowest.

By contrast, in rainy or snowy weather, as indicated by an arrow Q12, the capability of the millimeter-wave radar (76 GHz) at the time of distance measurement is the highest, and the capability of the millimeter-wave radar (24 GHz) is the next highest after the millimeter-wave radar (76 GHz). Then, the capability of the lidar is the next highest after the millimeter-wave radar (24 GHz), and the capabilities of the stereo camera and the monocular camera are the next highest after the lidar. The capability of the ultrasonic distance sensor is the lowest.

Moreover, at night, as indicated by an arrow Q13, the capability of the millimeter-wave radar (76 GHz) at the time of distance measurement is the highest, and the capability of the lidar is the next highest after the millimeter-wave radar (76 GHz). Further, the capability of the millimeter-wave radar (24 GHz) is the next highest after the lidar, and the capabilities of the stereo camera and the monocular camera are the next highest after the millimeter-wave radar (24 GHz). The capability of the ultrasonic distance sensor is the lowest.

In this manner, relative distance detection capabilities among the plurality of mutually different safety-function sensors change depending not only on the equipment information such as the type of the safety-function sensor but also on the environment in the surroundings of the surrounding vehicle.

Accordingly, the safety determination unit 152 appropriately determines the safety of the surrounding vehicle using not only the sensor-related information but also the environment information.

For example, in a case where the capability of the safety-function sensor of the surrounding vehicle is equal to or greater than the capability of the safety-function sensor of the host vehicle in the environment indicated by the environment information, the capability of the safety-function sensor installed in the surrounding vehicle is higher than the capability of the safety-function sensor installed in the host vehicle. Therefore, the safety of the surrounding vehicle is determined to be high.

Specifically, for example, assume that the safety-function sensor of the surrounding vehicle is a millimeter-wave radar, the safety-function sensor of the host vehicle is a stereo camera, and the weather is rainy in the surroundings of the host vehicle and the surrounding vehicle. In such a case, since the capability of the millimeter-wave radar is higher than the capability of the stereo camera, the safety of the surrounding vehicle is determined to be high.

On the other hand, for example, in a case where the capability of the safety-function sensor of the surrounding vehicle is lower than the capability of the safety-function sensor of the host vehicle in the environment indicated by the environment information, the safety of the surrounding vehicle is determined to be low.

It is noted that the safety of the surrounding vehicle may be evaluated (determined) in a multi-stage manner according to the difference between the capability of the safety-function sensor of the surrounding vehicle and the capability of the safety-function sensor of the host vehicle in the environment indicated by the environment information.

Further, even in a case where safety-function sensors are of the same type, the capabilities (specifications) vary depending on the manufacturers, models, or the like of the safety-function sensors. Therefore, safety may be determined in consideration of the sensor capability information as the equipment information included in the sensor-related information.

Specifically, for example, the capability of the safety-function sensor of the surrounding vehicle is assumed to be lower than the capability of the safety-function sensor of the host vehicle in terms of the types of the sensors in the environment indicated by the environment information. However, in a case where it can be said that the capability of the safety-function sensor of the surrounding vehicle is substantially correspond to the capability of the safety-function sensor of the host vehicle in consideration of the specification indicated by the sensor capability information of each of the safety-function sensors, the safety of the surrounding vehicle can be determined to be high.

Moreover, in a case where safety-function sensors are of the same type and specification but have been manufactured or installed in respective vehicles in different times, for example, their capabilities may, in some cases, become different due to aged deterioration or the like of the safety-function sensors. Therefore, safety may be determined in consideration of information that is included in each sensor-related information and that indicates the time of manufacture of the safety-function sensor or the time of installation of the safety-function sensor in the corresponding vehicle.

Specifically, for example, the capability of the safety-function sensor of the surrounding vehicle is assumed to be correspond to the capability of the safety-function sensor of the host vehicle in terms of the types of the sensors in the environment indicated by the environment information. However, since the time of manufacture of the safety-function sensor of the surrounding vehicle is much older than the time of manufacture of the safety-function sensor of the host vehicle, the capability of the safety-function sensor of the surrounding vehicle is considered to be lower than the capability of the safety-function sensor of the host vehicle considering the possibility of aged deterioration. In such a case, the safety of the surrounding vehicle can be determined to be low.

In addition, the safety of the surrounding vehicle may be determined on the basis of, for example, a combination of the environment indicated by the environment information and the capability of the safety-function sensor indicated by the sensor-related information of the surrounding vehicle, for example, the distance detection capability of the safety-function sensor identified from the sensor capability information.

In this case, for example, in a case where the safety-function sensor of the surrounding vehicle has a sufficient distance detection capability to ensure safety in the environment indicated by the environment information, that is, in a case where the distance detection capability is equal to or greater than a predetermined capability, the safety of the surrounding vehicle is determined to be high.

<Description of Driving Control Process>

Next, a specific example of a process in a case where safety is determined and driving and the like are controlled according to the result of the determination will be described.

First, a description will be given of an example where the vehicle 11 determines the safety of a preceding vehicle traveling ahead of the host vehicle in the same lane (travel lane) as the vehicle 11 and performs control for implementing a collision warning function or an AEBC (Autonomous Emergency Braking Control) function on the basis of the result of the determination.

Figure 4:
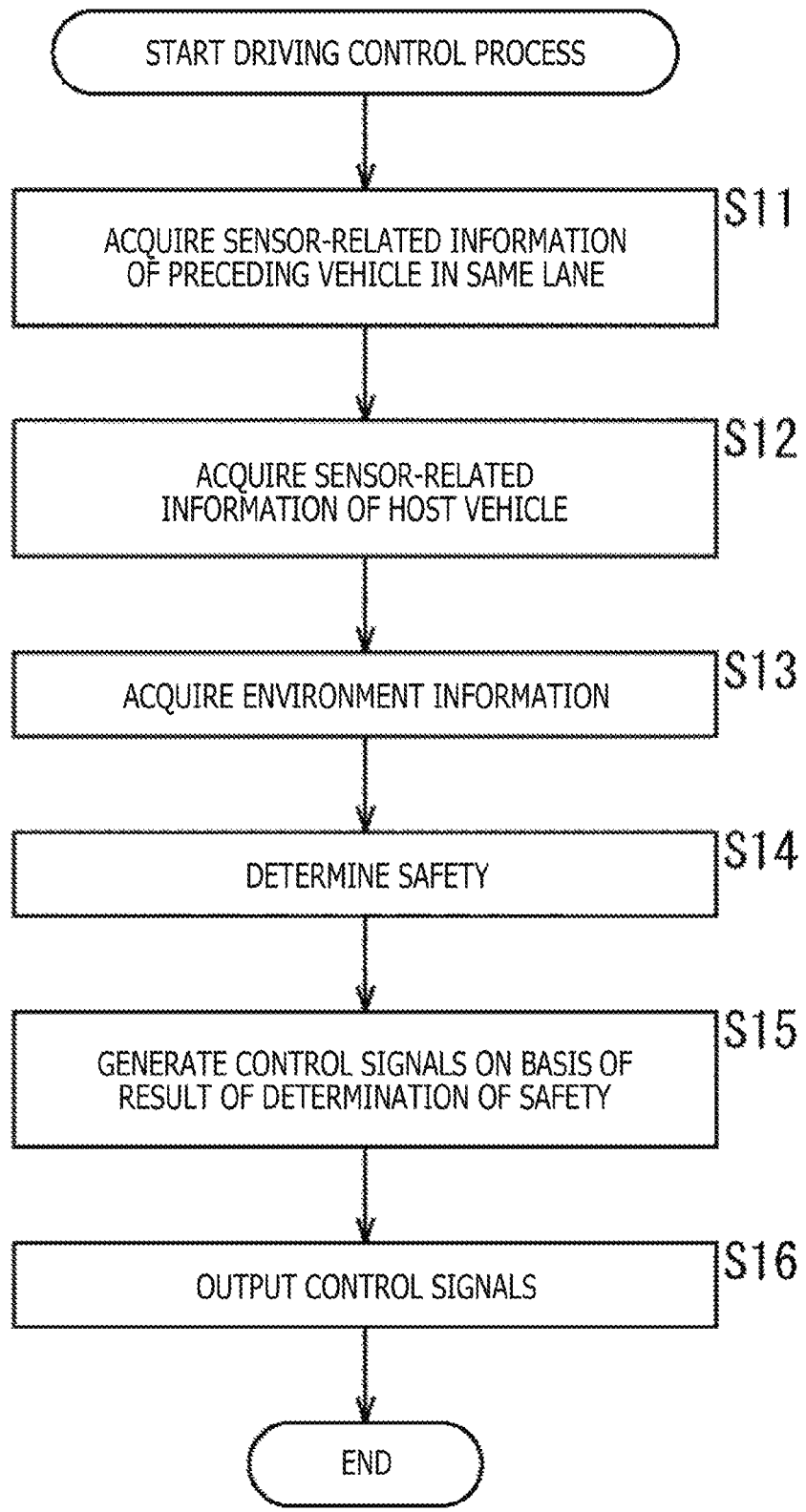
FIG. 4 is a flowchart for describing a driving control process.

In such a case, for example, the vehicle 11 performs a driving control process illustrated in FIG. 4. That is, hereinafter, the driving control process performed by the vehicle 11 will be described with reference to a flowchart in FIG. 4.

In step S11, the information acquisition unit 151 controls the communication unit 25 to acquire sensor-related information of a preceding vehicle traveling in the same lane as the host vehicle, that is, a vehicle traveling ahead of (immediately ahead of) the host vehicle.

For example, the communication unit 25 transmits a sensor-related information transmission request to the preceding vehicle and receives the sensor-related information transmitted from the preceding vehicle in response to the transmission request by performing vehicle-to-vehicle communication according to the control of the information acquisition unit 151. The communication unit 25 then supplies the sensor-related information to the information acquisition unit 151.

It is noted that a source from which the sensor-related information is acquired is not limited to the preceding vehicle and may be the server or the like.

For example, assume that the server records, for each vehicle, vehicle identification information and sensor-related information of a safety-function sensor, which is installed in the corresponding vehicle identified from the vehicle identification information, in association with each other. The vehicle identification information identifies the corresponding vehicle.

Here, the vehicle identification information is information related to the corresponding vehicle and including at least one of the license plate number of the vehicle (the license number of the vehicle), the type of the vehicle, or the model (model year) of the vehicle, for example. It is noted that in a case where vehicles of the same type or model have the same safety-function sensors installed therein, the safety-function sensors installed in the vehicles are uniquely determined without identifying the vehicles themselves as long as the type or the like of the vehicles can be identified, and therefore, the license number does not need to be included as the vehicle identification information.

In such a case, in the vehicle 11, for example, the information acquisition unit 151 acquires, from the front view camera ECU 33, a front image captured by the front view camera 32. The front image includes the entire preceding vehicle or at least a part of the preceding vehicle, such as a license plate portion of the preceding vehicle, as the subject. Then, the information acquisition unit 151 supplies the acquired front image and the sensor-related information transmission request to the communication unit 25 and controls the communication unit 25 to cause the communication unit 25 to transmit the front image and transmission request to the server via a communication network such as the Internet.

When the server receives the front image and transmission request transmitted from the vehicle 11, the server performs a process of transmitting the sensor-related information in response to the transmission request. That is, the server performs image analysis such as an image recognition process on the received front image and extracts, from the front image, information such as the type, the model, or the license number of the preceding vehicle as the vehicle identification information. Then, the server reads the sensor-related information recorded in association with the obtained vehicle identification information and transmits the sensor-related information to the vehicle 11 via the communication network.

Accordingly, in the vehicle 11, the communication unit 25 receives the sensor-related information transmitted from the server and supplies the sensor-related information to the information acquisition unit 151. Through this process, the information acquisition unit 151 has acquired the sensor-related information of the preceding vehicle from the server.

It is noted that although the server side obtains the vehicle identification information from the front image in the example described here, the control unit 141 may obtain the vehicle identification information by performing image analysis on the front image. In such a case, the information acquisition unit 151 acquires the sensor-related information by causing the communication unit 25 to transmit the vehicle identification information and the transmission request to the server.

Moreover, the vehicle identification information and the sensor-related information may be recorded on the vehicle 11 in association with each other, and the corresponding sensor-related information may be obtained using the vehicle identification information obtained by the control unit 141 performing image analysis on the front image.

In step S12, the information acquisition unit 151 acquires the sensor-related information of the host vehicle.

For example, the information acquisition unit 151 acquires the sensor-related information of the host vehicle from a recording unit or the safety-function sensor in the vehicle 11. Alternatively, for example, the information acquisition unit 151 may control the communication unit 25 to cause the communication unit 25 to communicate with the server connected via the communication network and acquire the sensor-related information of the host vehicle from the server.

In step S13, the information acquisition unit 151 acquires the environment information. For example, the information acquisition unit 151 controls the communication unit 25 to cause the communication unit 25 to communicate with the server connected via the communication network and acquires the environment information from the server.

In step S14, the safety determination unit 152 determines the safety of the preceding vehicle on the basis of the sensor-related information of the preceding vehicle, the sensor-related information of the host vehicle, and the environment information that have been acquired in the processes in steps S11 to S13.

Specifically, for example, the safety determination unit 152 compares the sensor-related information of the preceding vehicle with the sensor-related information of the host vehicle. In a case where the capability (performance) of the safety-function sensor of the preceding vehicle is higher than the capability of the safety-function sensor of the host vehicle in the environment indicated by the environment information, the safety determination unit 152 determines that the safety of the preceding vehicle is high. Further, for example, in a case where the time of manufacture of the safety-function sensor of the preceding vehicle is later than the time of manufacture of the safety-function sensor of the host vehicle, the safety determination unit 152 may determine that the safety of the preceding vehicle is high.

On the other hand, for example, in a case where the capability (performance) of the safety-function sensor of the preceding vehicle is lower than the capability of the safety-function sensor of the host vehicle in the environment indicated by the environment information, the safety of the preceding vehicle is determined to be low. That is, in a case where the capability of the safety-function sensor of the preceding vehicle is below the capability of the safety-function sensor of the host vehicle, the safety of the preceding vehicle is determined to be low.

In step S15, the control signal generation unit 153 generates control signals for controlling driving (traveling) and the like of the vehicle 11 on the basis of the result of the determination of the safety in step S14.

For example, assume that as for driving (traveling) control, such as driving assistance or autonomous driving, of the host vehicle, the driving control is performed such that the following distance between the host vehicle and the preceding vehicle is equal to or greater than a predetermined distance.

In this case, for example, in a case where the result of the determination indicating that the safety of the preceding vehicle is high is obtained as the result of the determination of the safety, the control signal generation unit 153 sets the distance, that is, the following distance, between the host vehicle and the preceding vehicle to the predetermined distance (hereinafter also referred to as a normal distance La).

On the other hand, for example, in a case where the result of the determination indicating that the safety of the preceding vehicle is low is obtained as the result of the determination of the safety, the control signal generation unit 153 sets the distance, that is, the following distance, between the host vehicle and the preceding vehicle, to a distance Lb, which is greater than the normal distance La.

Then, the control signal generation unit 153 generates control signals for driving the engine 35 and control signals for driving the braking apparatus 34 such that the following distance between the host vehicle and the preceding vehicle does not become smaller than the set distance, that is, the normal distance La or the distance Lb. That is, control signals for controlling the following distance are generated.

It is noted that in a case where the result of the determination is multi-staged as the result of the determination of the safety, the following distance only needs to be set in a multi-stage manner according to the multi-staged determination result. In such a case, for example, in a case where the capability of the safety-function sensor of the host vehicle is higher than the capability of the safety-function sensor of the preceding vehicle, a greater following distance only needs to be set as the difference between their capabilities is greater.

Further, for example, assume that driving control is performed so as to brake hard at a predetermined timing using the AEBC function.

In this case, for example, in a case where the result of the determination indicating that the safety of the preceding vehicle is high is obtained as the result of the determination of the safety, the control signal generation unit 153 sets a timing for braking hard to a predetermined timing (hereinafter also referred to as a normal timing Ta).

On the other hand, for example, in a case where the result of the determination indicating that the safety of the preceding vehicle is low is obtained as the result of the determination of the safety, the control signal generation unit 153 sets the timing for braking hard to a timing Tb, which is earlier than the normal timing Ta.

Here, the timing for braking hard is, for example, the timing at which the following distance between the host vehicle and the preceding vehicle becomes equal to or smaller than the predetermined distance. Therefore, in this case, for example, the following distance at the timing Tb is greater than the following distance at the normal timing Ta.

After setting the timing for braking hard, the control signal generation unit 153 generates control signals for driving the engine 35 and control signals for driving the braking apparatus 34 according to the setting. That is, control signals for controlling braking are generated. At this time, in a case where the set timing, that is, the normal timing Ta or the timing Tb, comes, the control signal generation unit 153 generates the control signals for directing hard braking.

It is noted that in a case where the result of the determination is multi-staged as the result of the determination of the safety, the timing for braking hard only needs to be set in a multi-stage manner, as in the case of the control of the following distance. In such a case, for example, in a case where the capability of the safety-function sensor of the host vehicle is higher than the capability of the safety-function sensor of the preceding vehicle, hard braking only needs to be performed at an earlier timing as the difference between their capabilities is greater. Further, instead of the control signals for controlling braking, control signals for changing a lane to avoid a rear-end collision or the like with the preceding vehicle may be generated.

Moreover, for example, assume that control is performed such that a collision warning is output at a predetermined timing using the collision warning function.

In this case, for example, in a case where the result of the determination indicating that the safety of the preceding vehicle is high is obtained as the result of the determination of the safety, the control signal generation unit 153 sets a timing for issuing a collision warning to a predetermined timing (hereinafter also referred to as a normal timing Aa).

On the other hand, for example, in a case where the result of the determination indicating that the safety of the preceding vehicle is low is obtained as the result of the determination of the safety, the control signal generation unit 153 sets the timing for issuing a collision warning to a timing Ab, which is earlier than the normal timing Aa.

Here, the timing for issuing a collision warning is, for example, the timing at which the distance between the host vehicle and the preceding vehicle or an obstacle becomes equal to or smaller than the predetermined distance. Therefore, in this case, for example, the distance at the timing Ab is greater than the distance at the normal timing Aa.

After setting the timing for issuing a collision warning, the control signal generation unit 153 generates control signals according to the setting. That is, in a case where the set timing, that is, the normal timing Aa or the timing Ab comes, the control signal generation unit 153 generates control signals for causing the display unit 24 to display an image of a collision warning and control signals for causing a speaker provided in the vehicle 11 to output a warning sound for the collision warning. It is noted that in a case where the result of the determination is multi-staged as the result of the determination of the safety, the timing for issuing a collision warning only needs to be set in a multi-stage manner according to the multi-staged determination result.

In addition, for example, in a case where the result of the determination indicating that the safety of the preceding vehicle is high is obtained, driving (traveling) and the like may be controlled using the sensor output information included in the sensor-related information acquired from the preceding vehicle.

Specifically, for example, assume that when safety is determined in step S14, the sensor capability of the front sensing camera 21 as the safety-function sensor of the host vehicle is compared with the capability of a rear sensor as the safety-function sensor of the preceding vehicle. Then, assume that the capability of the safety-function sensor of the preceding vehicle is higher than the capability of the safety-function sensor of the host vehicle and thus the safety of the preceding vehicle is determined to be high.

Here, assume that the front sensing camera 21 is used to measure the distance from the host vehicle to the preceding vehicle, while the rear sensor as the safety-function sensor of the preceding vehicle is a sensor that measures the distance from the preceding vehicle to the host vehicle behind the preceding vehicle. In this case, since the capability of the safety-function sensor of the preceding vehicle is higher than the capability of the safety-function sensor of the host vehicle, the safety-function sensor of the preceding vehicle can obtain a more precise distance measurement result.

Therefore, for example, the control signal generation unit 153 uses the result of the measurement of the distance from the preceding vehicle to the host vehicle as the sensor output information included in the sensor-related information of the preceding vehicle to generate control signals for controlling traveling (following distance) of the vehicle 11 such that the following distance between the host vehicle and the preceding vehicle becomes the normal distance La. Accordingly, it is possible to more appropriately control driving and the like using more precise sensor output information.

The control signals are generated on the basis of the result of the determination of the safety through the above-described process. After that, the process proceeds to step S16.

In step S16, the control signal generation unit 153 outputs the control signals generated in the process in step S15 to each unit of the vehicle 11, and the driving control process ends.

That is, for example, the control signal generation unit 153 supplies the control signals to the engine 35 and the braking apparatus 34 to drive the engine 35 and the braking apparatus 34 or supplies the control signals to the display unit 24 to cause the display unit 24 to output a collision warning.

As above, the vehicle 11 determines the safety of the preceding vehicle on the basis of the sensor-related information of each of the preceding vehicle and the host vehicle and the environment information and generates the control signals corresponding to the result of the determination. By controlling driving and the like in consideration of the information related to the safety-function sensor of the preceding vehicle and the surrounding environment in this manner, it is possible to perform more appropriate control, thereby improving the safety.

Second Embodiment

<Description of Driving Control Process>

Further, in the example described above, control related to the collision warning function or the AEBC function is performed on the basis of the result of the determination of the safety. In addition, however, the result of the determination of the safety can also be used for control for implementing an ACC (Adaptive Cruise Control) function. The ACC function is a function for controlling driving of the host vehicle such that the host vehicle follows a preceding vehicle traveling ahead of the host vehicle.

Hereinafter, a driving control process performed by the vehicle 11 for such a case will be described with reference to a flowchart in FIG. 5.

In step S41, the information acquisition unit 151 acquires sensor-related information of each of a preceding vehicle traveling in the same lane as the host vehicle and a preceding vehicle traveling in another lane neighboring the lane in which the host vehicle travels.

That is, here, a process similar to the process in step S11 in FIG. 4 is performed to acquire sensor-related information of each of a plurality of preceding vehicles such as the preceding vehicle traveling ahead of the host vehicle in the same lane as the host vehicle and the preceding vehicle traveling ahead of the host vehicle in another lane different from the lane of the host vehicle.

After the process in step S41 is performed, a process in step S42 is performed to acquire environment information. However, since the process in step S42 is similar to the process in step S13 in FIG. 4, the description thereof is omitted.

In step S43, the safety determination unit 152 determines the safety of the preceding vehicles on the basis of the sensor-related information of each of the preceding vehicles and the environment information.

For example, the safety determination unit 152 selects one preceding vehicle having a safety-function sensor whose capability is the highest in the environment indicated by the environment information by comparing, with each other, the capability of the safety-function sensor indicated by the sensor-related information of each of the plurality of preceding vehicles. The safety determination unit 152 then determines that the safety of this preceding vehicle is the highest.

In this example, therefore, the result of the selection of the safest preceding vehicle among the plurality of preceding vehicles is obtained as the result of the determination of the safety.

In step S44, the control signal generation unit 153 generates control signals for controlling driving (traveling) of the vehicle 11 on the basis of the result of the determination of the safety in step S43.

Specifically, the control signal generation unit 153 appropriately generates control signals for changing a lane, following the preceding vehicle at a predetermined following distance, or the like such that the host vehicle follows the preceding vehicle that is determined to be the safest and obtained as the result of the determination of the safety in step S43. That is, control signals for following the safest preceding vehicle are generated. By following the safest preceding vehicle among the plurality of preceding vehicles in this manner, it is possible to improve the safety of the host vehicle.

In step S45, the control signal generation unit 153 outputs the control signals generated in the process in step S44 to each unit of the vehicle 11, and the driving control process ends.

That is, for example, the control signal generation unit 153 supplies the control signals to the engine 35 and the braking apparatus 34 to drive the engine 35 and the braking apparatus 34 or supplies the control signals to the steering mechanism 26 to cause the steering mechanism 26 to change a lane.

As above, the vehicle 11 determines the safety of the preceding vehicles on the basis of the sensor-related information of each of the plurality of preceding vehicles and the environment information and generates the control signals corresponding to the result of the determination. By controlling driving and the like in consideration of the information related to the safety-function sensors of the preceding vehicles and the surrounding environment in this manner, it is possible to perform more appropriate control, thereby improving the safety.

Third Embodiment

<Description of Driving Control Process>

Moreover, sensor output information may be acquired as sensor-related information from a preceding vehicle, and the safety of the preceding vehicle may be determined.

Figure 6:
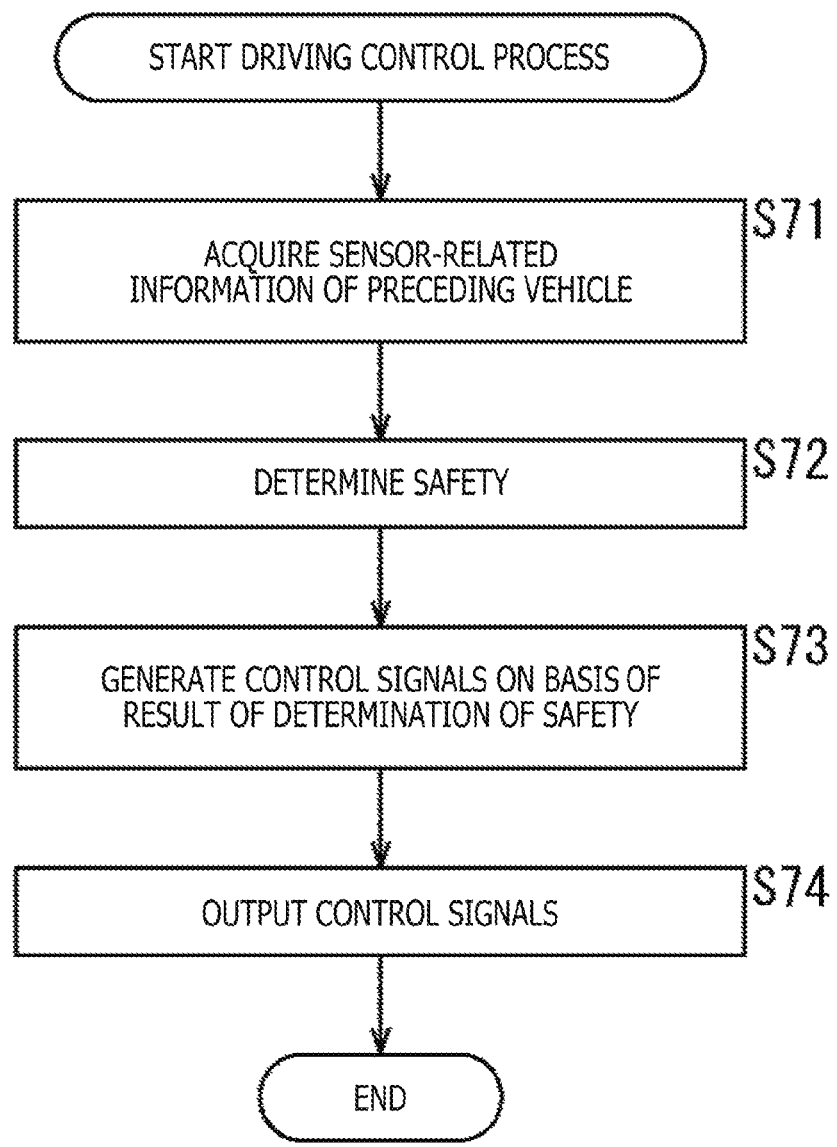
FIG. 6 is a flowchart for describing a driving control process.

In such a case, the vehicle 11 performs a driving control process illustrated in FIG. 6. Hereinafter, the driving control process performed by the vehicle 11 will be described with reference to a flowchart in FIG. 6.

In step S71, the information acquisition unit 151 acquires sensor-related information of a preceding vehicle traveling in the same lane as the host vehicle. In step S71, although a process similar to the process in step S11 in FIG. 4 is performed to acquire the sensor-related information, the sensor-related information acquired here includes at least sensor output information.

In step S72, the safety determination unit 152 determines the safety of the preceding vehicle on the basis of the sensor-related information of the preceding vehicle. Here, the safety determination unit 152 determines whether or not the safety of the preceding vehicle is high on the basis of the sensor output information as the sensor-related information.

Specifically, for example, a vehicle traveling further ahead of the preceding vehicle traveling immediately ahead of the host vehicle will be referred to as a vehicle traveling ahead. The vehicle traveling ahead is a vehicle traveling two vehicles ahead of the host vehicle in the same lane as the host vehicle.

In such a case, as long as the following distance between the preceding vehicle and the vehicle traveling ahead is sufficient, there is a low possibility that the preceding vehicle collides with the vehicle traveling ahead even in a case where, for example, the vehicle traveling ahead brakes hard or the like. Therefore, it can be said that the safety of the preceding vehicle is high.

Therefore, for example, in a case where the following distance between the preceding vehicle and the vehicle traveling ahead, which is indicated by distance information as the sensor output information of the sensor-related information of the preceding vehicle, is equal to or greater than a predetermined threshold value, the safety determination unit 152 determines that the safety of the preceding vehicle is high. Here, the threshold value used for comparison with the distance information may be a predetermined value or may be adaptively defined according to the traveling speeds of the host vehicle and the preceding vehicle, equipment information included in the sensor-related information of the preceding vehicle, or the like.

Further, for example, in a case where the sensor output information is not the distance information but a sensor output image, the safety determination unit 152 performs image analysis or the like on the sensor output image to calculate the following distance between the preceding vehicle and the vehicle traveling ahead from the size or the like of the vehicle traveling ahead on the sensor output image. Then, the safety determination unit 152 determines safety by comparing the obtained following distance with the threshold value.

In addition, for example, the sensor-related information of the preceding vehicle may, in some cases, include the result of object detection, the result of collision determination, and the like obtained by the preceding vehicle.

Therefore, for example, in a case where the sensor-related information includes the result of the detection indicating that no object such as an obstacle has been detected as the result of the object detection, the safety determination unit 152 determines that the safety of the preceding vehicle is high.

Further, for example, in a case where the sensor-related information includes the result of the determination indicating that the risk of collision with another vehicle or an obstacle is low as the result of the collision determination, the safety determination unit 152 determines that the safety of the preceding vehicle is high.

It is noted that safety may be determined from a combination of the sensor output information and the equipment information. Further, in step S72, the result of the determination of the safety may be multi-staged.

In step S73, the control signal generation unit 153 generates control signals for controlling driving (traveling) and the like of the vehicle 11 on the basis of the result of the determination of the safety in step S72.

For example, as in the case of step S15 in FIG. 4, the control signal generation unit 153 sets the following distance, the timing for braking hard, and the timing for issuing a collision warning according to the result of the determination of the safety and generates control signals according to the settings.

At this time, for example, in a case where the result of the determination indicating that the safety of the preceding vehicle is low is obtained as the result of the determination of the safety, the following distance is set to be greater than a predetermined normal distance, the timing for braking hard is set to be earlier than a predetermined normal timing, and the timing for issuing a collision warning is also set to be earlier than a predetermined normal timing.

Further, for example, in a case where the result of the determination indicating that the safety of the preceding vehicle is low is obtained as the result of the determination of the safety, the control signal generation unit 153 may generate control signals for braking or control signals for changing a lane to a lane adjacent to the lane in which the host vehicle travels. In this manner, control for avoiding a dangerous situation is performed.

In addition, for example, in a case where the result of the determination indicating that the safety of the preceding vehicle is low is obtained as the result of the determination of the safety while the host vehicle follows the preceding vehicle, the control signal generation unit 153 can also generate control signals for stopping following the preceding vehicle. It is noted that at this time, a message indicating that the following has been stopped or a warning about the safety of the preceding vehicle may be appropriately issued.

Moreover, as in the case of FIG. 4, driving (traveling) and the like may be controlled using the sensor output information included in the sensor-related information acquired from the preceding vehicle.

In this case, the sensor-related information of the host vehicle and the environment information are also appropriately acquired and the sensor-related information of the host vehicle is compared with the sensor-related information of the preceding vehicle. In a case where the capability of the safety-function sensor of the preceding vehicle is higher than the capability of the safety-function sensor of the host vehicle, the sensor output information of the preceding vehicle may be used to control driving and the like of the host vehicle. Specifically, for example, as the sensor output information, the following distance between the preceding vehicle and the host vehicle or the like, which has been measured by the rear sensor that is the safety-function sensor of the preceding vehicle, is used to control driving and the like. Moreover, for example, braking control and the like may be performed on the basis of the result of detection of an object such as an obstacle acquired from the preceding vehicle as the sensor output information.

In step S74, the control signal generation unit 153 outputs the control signals generated in the process in step S73 to each unit of the vehicle 11, and the driving control process ends. That is, for example, the control signal generation unit 153 supplies the control signals to the engine 35 and the braking apparatus 34 to drive the engine 35 and the braking apparatus 34 or supplies the control signals to the display unit 24 to cause the display unit 24 to output a warning.

As above, the vehicle 11 determines the safety of the preceding vehicle on the basis of the sensor-related information of the preceding vehicle and generates the control signals corresponding to the result of the determination. By using the sensor output information as the sensor-related information obtained by the preceding vehicle in this manner, the safety of the preceding vehicle can be determined in consideration of the state and the like of the vehicle traveling ahead. Accordingly, it is possible to perform more appropriate control, thereby improving the safety.

Fourth Embodiment

<Example of Configuration of Server>

It is noted that as described above, a source from which the vehicle 11 acquires sensor-related information of a preceding vehicle may be an apparatus, such as a server, other than the preceding vehicle. Hereinafter, processes performed by the vehicle 11 and the server in a case where the vehicle 11 acquires the sensor-related information of the preceding vehicle from the server will be described.

Figure 7:
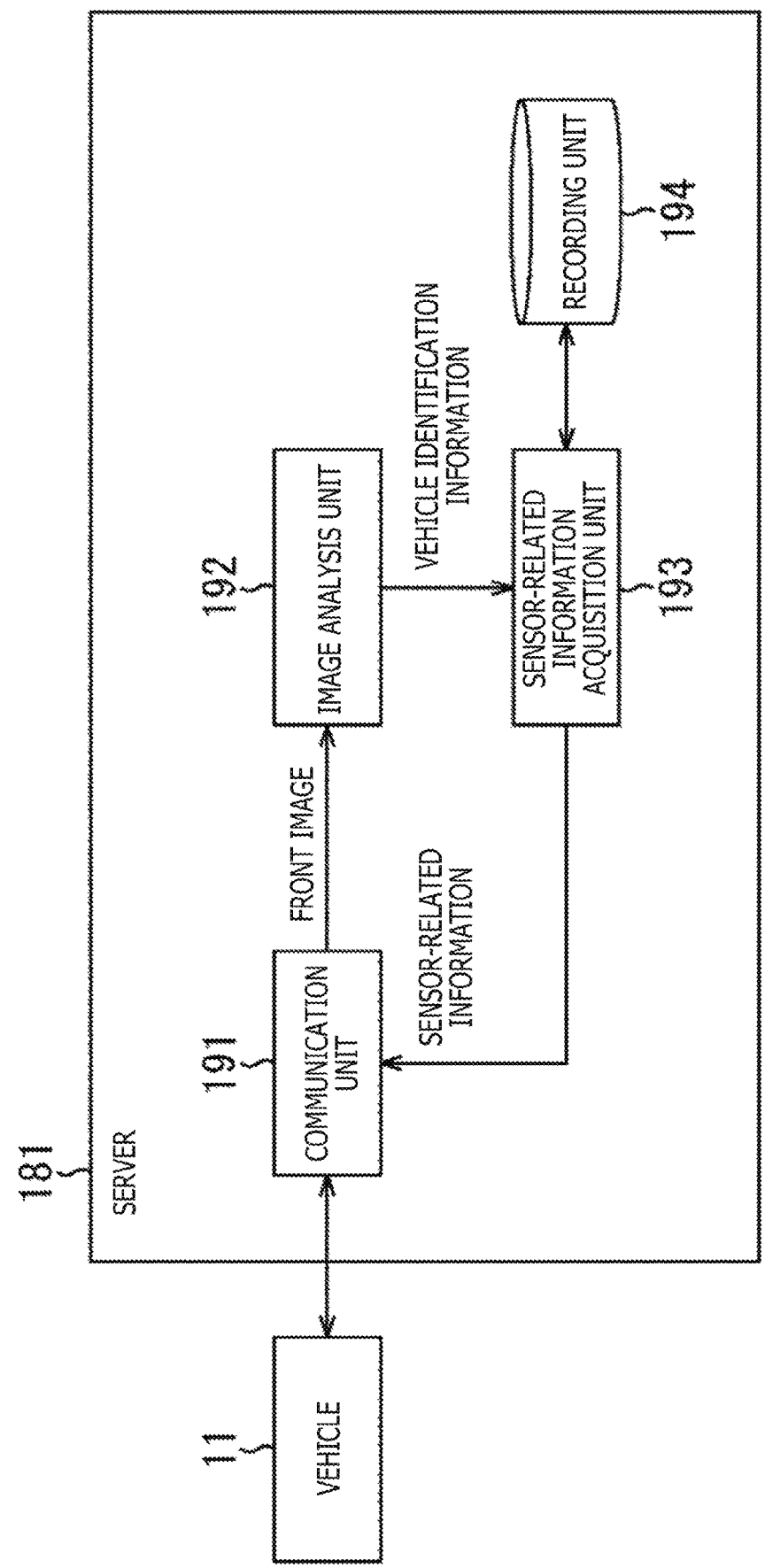
FIG. 7 is a diagram illustrating an example of a configuration of a server.

In such a case, for example, the server is configured as illustrated in FIG. 7.

A server 181 illustrated in FIG. 7 is a signal processing apparatus that communicates with the vehicle 11 via a communication network. In this example, the server 181 includes a communication unit 191, an image analysis unit 192, a sensor-related information acquisition unit 193, and a recording unit 194.

The communication unit 191 communicates with the vehicle 11 via the communication network to receive various kinds of information such as a front image transmitted from the vehicle 11 and supply the information to the image analysis unit 192 or to transmit various kinds of information such as sensor-related information supplied from the sensor-related information acquisition unit 193 to the vehicle 11.

The image analysis unit 192 performs image analysis such as image recognition on the front image of the vehicle 11 supplied from the communication unit 191 and supplies resulting vehicle identification information to the sensor-related information acquisition unit 193.

The sensor-related information acquisition unit 193 acquires sensor-related information, which is recorded in association with the vehicle identification information, from the recording unit 194 on the basis of the vehicle identification information supplied from the image analysis unit 192, and supplies the sensor-related information to the communication unit 191.

The recording unit 194 is a database that records the vehicle identification information and the sensor-related information in association with each other, and supplies the recorded sensor-related information to the sensor-related information acquisition unit 193.

<Description of Information Acquisition Process and Transmission Process>

Next, a process performed in a case where the vehicle 11 receives sensor-related information by communicating with the server 181 illustrated in FIG. 7 will be described. That is, hereinafter, an information acquisition process performed by the vehicle 11 and a transmission process performed by the server 181 will be described with reference to a flowchart in FIG. 8.

When the vehicle 11 starts the information acquisition process, the information acquisition unit 151 of the vehicle 11 acquires a front image in step S101.

For example, the information acquisition unit 151 acquires, from the front view camera ECU 33, a front image captured by the front view camera 32. The front image includes at least a part of a preceding vehicle as the subject. Then, the information acquisition unit 151 supplies the acquired front image and a sensor-related information transmission request to the communication unit 25.

In step S102, the communication unit 25 transmits the front image and transmission request supplied from the information acquisition unit 151 to the server 181 via the communication network.

Then, in the server 181, the communication unit 191 receives the front image and transmission request transmitted from the vehicle 11 and supplies the received front image to the image analysis unit 192 in step S121.

In this manner, when the server 181 receives the transmission request, the server 181 performs a process corresponding to the transmission request.

That is, in step S122, the image analysis unit 192 performs image analysis such as an image recognition process on the front image supplied from the communication unit 191 and extracts, from the front image, information such as the type, the model, or the license number of the preceding vehicle as vehicle identification information. The image analysis unit 192 supplies the vehicle identification information of the preceding vehicle obtained by the image analysis to the sensor-related information acquisition unit 193.

In step S123, the sensor-related information acquisition unit 193 acquires sensor-related information of the preceding vehicle from the recording unit 194 by reading the sensor-related information recorded on the recording unit 194 in association with the vehicle identification information supplied from the image analysis unit 192. The sensor-related information acquisition unit 193 supplies the acquired sensor-related information to the communication unit 191.

In step S124, the communication unit 191 transmits the sensor-related information supplied from the sensor-related information acquisition unit 193 to the vehicle 11 via the communication network, and the transmission process ends.

Further, when the server 181 transmits the sensor-related information, the communication unit 25 in the vehicle 11 receives the sensor-related information of the preceding vehicle transmitted from the server 181 and supplies the sensor-related information to the control unit 141 in step S103. Then, when the information acquisition unit 151 of the control unit 141 acquires the sensor-related information supplied from the communication unit 25, the information acquisition process ends.

As above, the vehicle 11 transmits the front image to the server 181 and receives the sensor-related information transmitted from the server 181 in response. Further, in response to the request from the vehicle 11, the server 181 extracts the vehicle identification information from the front image, reads the sensor-related information, and transmits the sensor-related information to the vehicle 11.

In this manner, even in a case where the vehicle 11 cannot perform vehicle-to-vehicle communication with the preceding vehicle, the vehicle 11 can obtain the sensor-related information necessary to determine safety.

Figure 5:
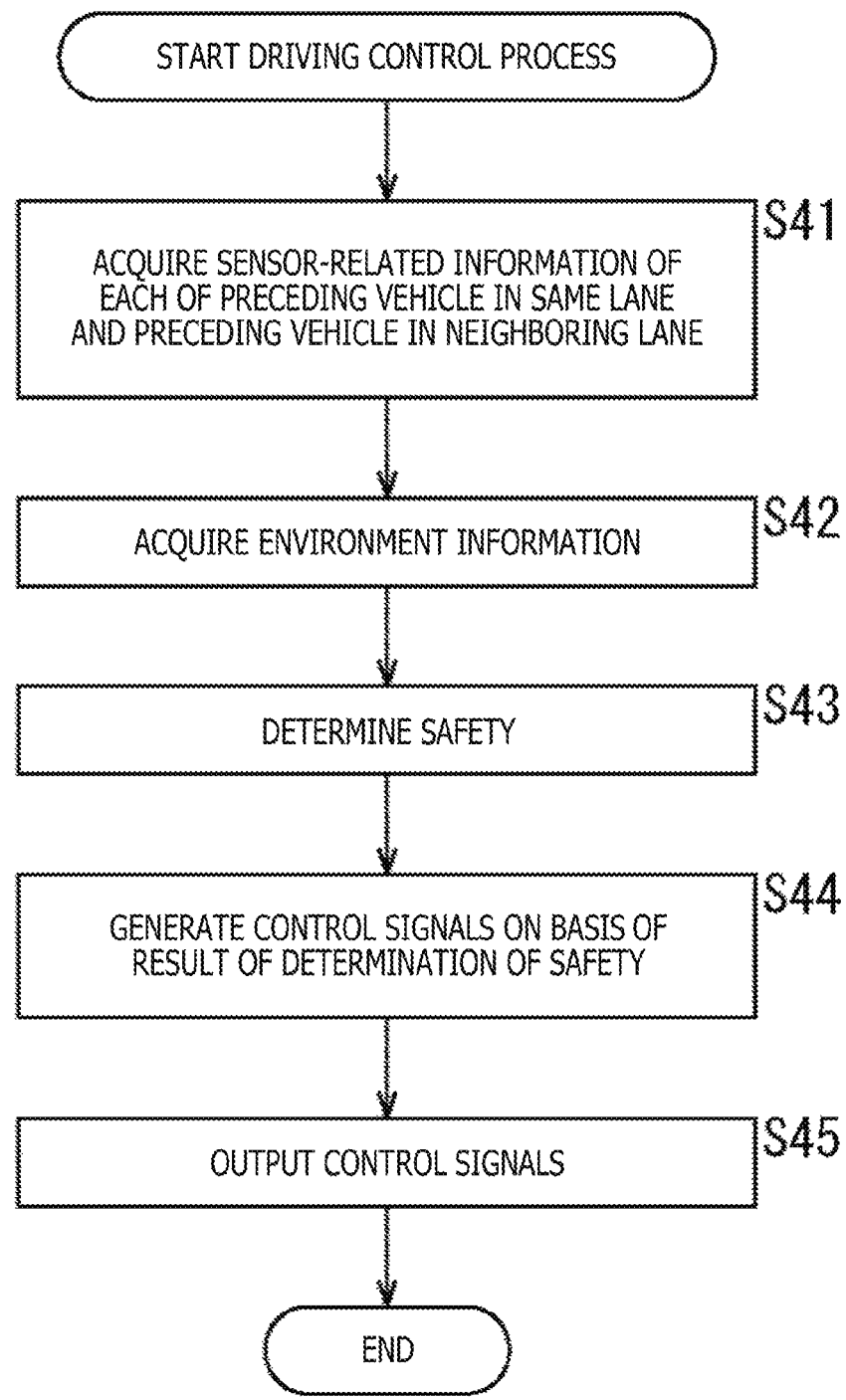
FIG. 5 is a flowchart for describing a driving control process.
Figure 8:
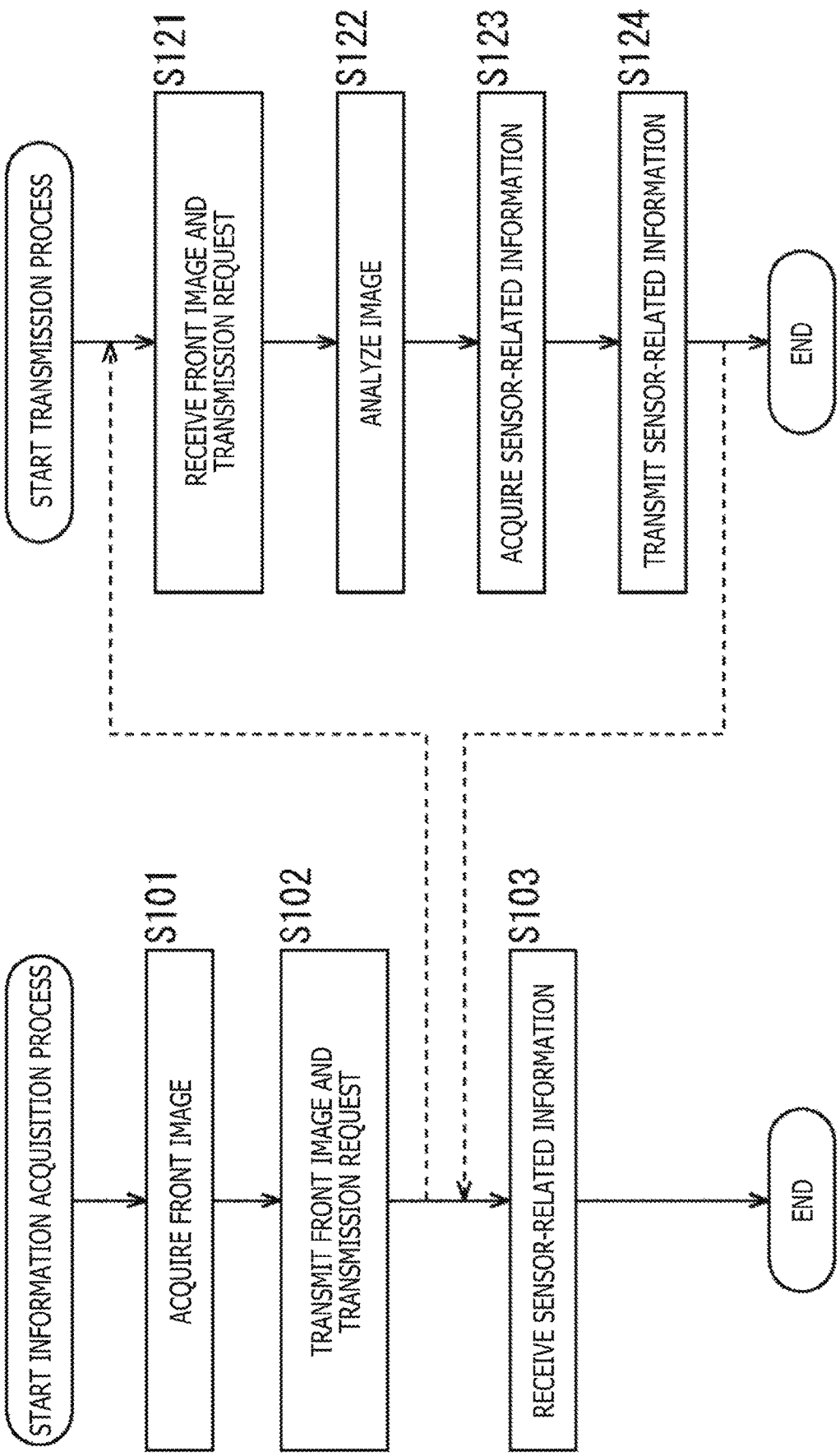
FIG. 8 is a flowchart for describing an information acquisition process and a transmission process.

For example, the information acquisition process described above is performed as the process in step S11 in FIG. 4 or the process in step S41 in FIG. 5. It is noted that in a case where the information acquisition process described with reference to FIG. 8 is performed as the process in step S41 in FIG. 5, not only a preceding vehicle in the same lane as the host vehicle but also a preceding vehicle traveling in a lane adjacent to the lane in which the host vehicle travels are included as the subjects in the front image acquired in step S101.

Further, here, although a description has been given of a case, as an example, where the sensor-related information of the preceding vehicle is acquired from the server 181, the sensor-related information of the host vehicle may also be acquired from the server 181. In such a case, the vehicle identification information of the host vehicle is transmitted to the server 181.

Fifth Embodiment

<Example of Functional Configuration of Vehicle>

Moreover, although a description has been given of a case where safety is determined in the host vehicle, safety may be determined on the server side.

Figure 9:
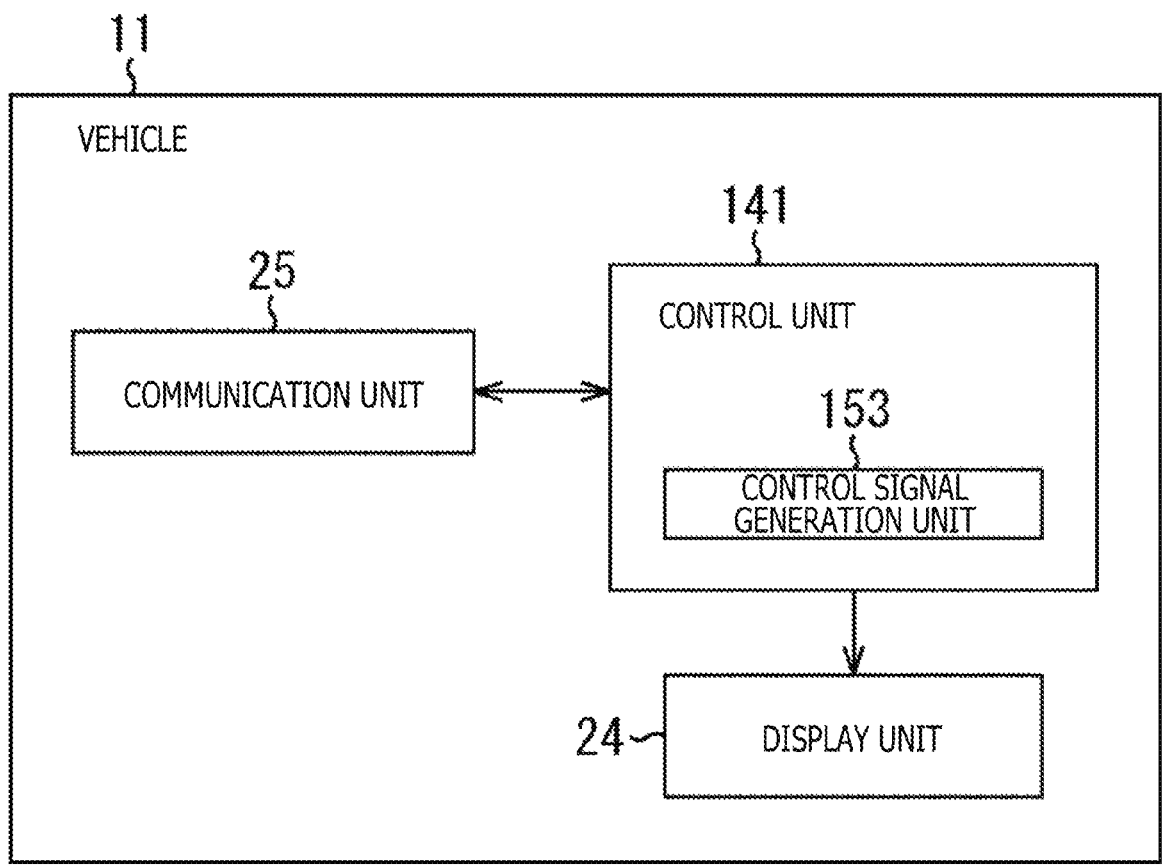
FIG. 9 is a diagram illustrating an example of a functional configuration of the vehicle.

In such a case, a functional configuration of the vehicle 11 is, for example, as illustrated in FIG. 9. It is noted that in FIG. 9, parts corresponding to those in FIG. 2 are denoted by the same reference signs, and the description thereof is omitted as appropriate.

In the example illustrated in FIG. 9, the vehicle 11 includes the control unit 141, the display unit 24, and the communication unit 25. The control unit 141 includes the control signal generation unit 153.

The functional configuration of the vehicle 11 illustrated in FIG. 9 is different from the configuration of the vehicle 11 illustrated in FIG. 2 in that the information acquisition unit 151 and the safety determination unit 152 are not provided. Except for this point, the functional configuration of the vehicle 11 illustrated in FIG. 9 is the same as that of the vehicle 11 illustrated in FIG. 2.

<Example of Configuration of Server>

Figure 10:
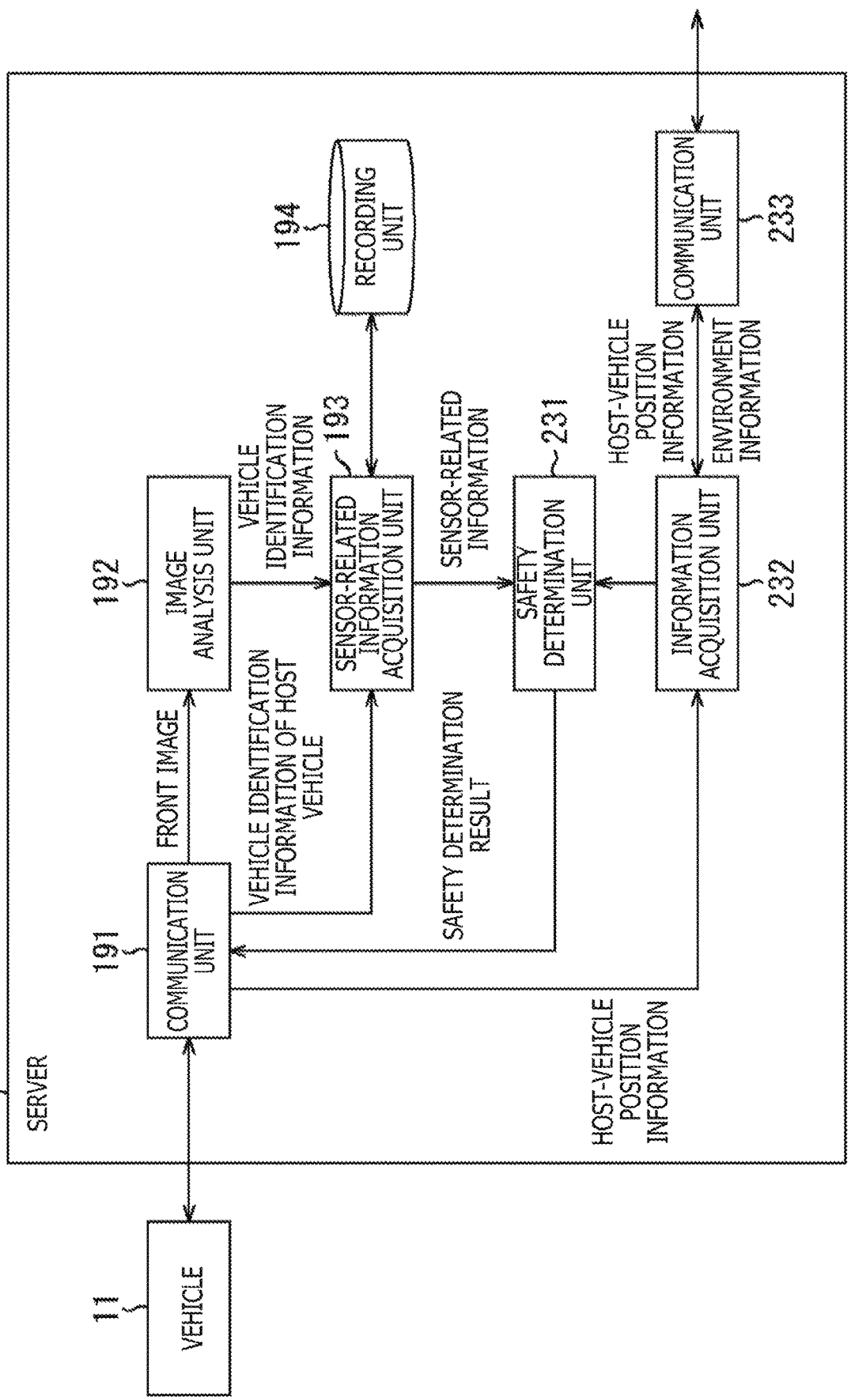
FIG. 10 is a diagram illustrating an example of a configuration of a server.

Further, in a case where safety is determined on the server side, the server is configured as illustrated in FIG. 10, for example. It is noted that in FIG. 10, parts corresponding to those in FIG. 7 are denoted by the same reference signs, and the description thereof is omitted as appropriate.

A server 221 illustrated in FIG. 10 includes the communication unit 191, the image analysis unit 192, the sensor-related information acquisition unit 193, the recording unit 194, a safety determination unit 231, an information acquisition unit 232, and a communication unit 233.

The safety determination unit 231 determines the safety of a preceding vehicle viewed from the vehicle 11 on the basis of sensor-related information supplied from the sensor-related information acquisition unit 193 and environment information supplied from the information acquisition unit 232, and supplies the result of the determination to the communication unit 191.

The information acquisition unit 232 supplies host-vehicle position information supplied from the communication unit 191 to the communication unit 233. The host-vehicle position information indicates the position of the vehicle 11 in a real space. The information acquisition unit 232 causes the communication unit 233 to transmit the host-vehicle position information to another external server or the like, thereby acquiring the environment information indicating the environment in the surroundings of the vehicle 11.

The communication unit 233 communicates with the external server or the like via a communication network. For example, the communication unit 233 transmits the host-vehicle position information supplied from the information acquisition unit 232 to the external server or the like and receives the environment information transmitted from the external server or the like in response to the transmission of the host-vehicle position information. The communication unit 233 supplies the environment information to the information acquisition unit 232.

It is noted that the process performed by the communication unit 233 may be performed by the communication unit 191. That is, the communication unit 233 may be implemented by the communication unit 191.

<Description of Driving Control Process and Safety Determination Process>

Figure 11:
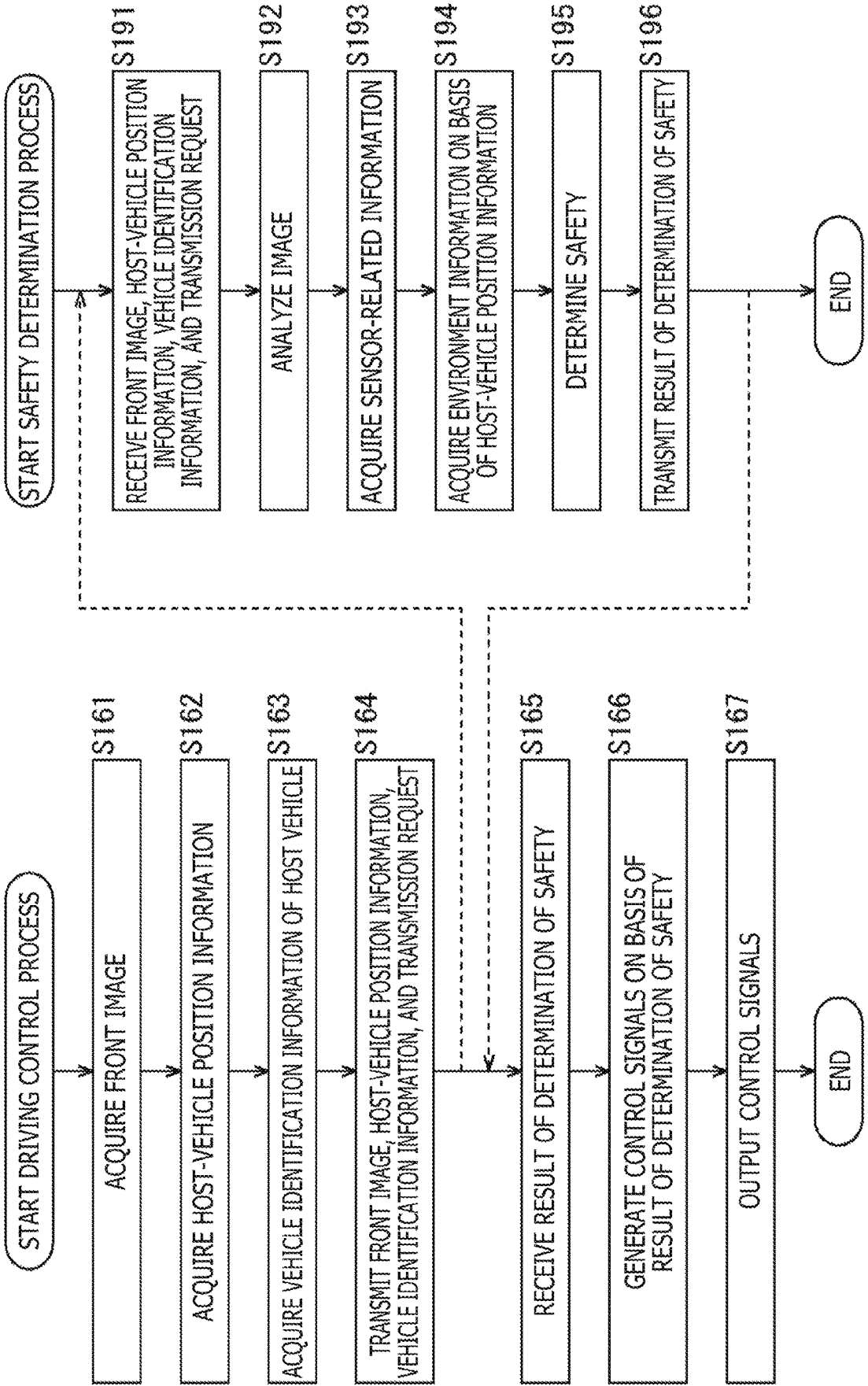
FIG. 11 is a flowchart for describing a driving control process and a safety determination process.

Next, operations of the vehicle 11 having the configuration illustrated in FIG. 9 and the server 221 illustrated in FIG. 10 will be described. That is, hereinafter, a driving control process performed by the vehicle 11 and a safety determination process performed by the server 221 will be described below with reference to a flowchart in FIG. 11.

When the driving control process starts, the control unit 141 of the vehicle 11 acquires a front image in step S161. For example, in step S161, a process similar to the process in step S101 in FIG. 8 is performed to acquire a front image including at least a part of a preceding vehicle as the subject.

In step S162, the control unit 141 acquires host-vehicle position information indicating the position of the vehicle 11 in the real space. For example, the control unit 141 controls the position information measurement system as the position information acquisition unit 23 to cause the position information measurement system to detect the position of the vehicle 11, and acquires position information indicating the result of the detection from the position information acquisition unit 23. Then, the control unit 141 employs, without change, the position information acquired from the position information acquisition unit 23 as the host-vehicle position information indicating the position of the vehicle 11.

In step S163, the control unit 141 acquires vehicle identification information of the host vehicle.

For example, the vehicle identification information for identifying the vehicle 11 is recorded in advance on a recording unit, not illustrated, provided in the integrated ECU 31. The control unit 141 acquires the vehicle identification information of the host vehicle by reading the vehicle identification information recorded on the recording unit.

Further, the control unit 141 supplies a transmission request for requesting transmission of the result of the determination of the safety to the communication unit 25, together with the front image, the host-vehicle position information, and the vehicle identification information of the host vehicle that have been acquired in the processes described above.

In step S164, the communication unit 25 supplies the front image, the host-vehicle position information, the vehicle identification information of the host vehicle, and the transmission request that have been supplied from the control unit 141 to the server 221 via the communication network.

Then, in the server 221, in step S191, the communication unit 191 receives the front image, the host-vehicle position information, the vehicle identification information of the vehicle 11, and the transmission request that have been transmitted from the vehicle 11. The communication unit 191 supplies the received front image to the image analysis unit 192, supplies the received vehicle identification information of the vehicle 11 to the sensor-related information acquisition unit 193, and supplies the received host-vehicle position information to the information acquisition unit 232.

When the server 221 receives the transmission request in this manner, the server 221 performs a process corresponding to the transmission request.

That is, the image analysis unit 192 performs image analysis such as an image recognition process on the front image supplied from the communication unit 191 and supplies resulting vehicle identification information of the preceding vehicle to the sensor-related information acquisition unit 193 in step S192. In step S192, a process similar to the process in step S122 in FIG. 8 is performed.

In step S193, the sensor-related information acquisition unit 193 acquires, from the recording unit 194, sensor-related information of each of the vehicle 11 and the preceding vehicle viewed from the vehicle 11.

That is, as for the sensor-related information of the preceding vehicle, the sensor-related information acquisition unit 193 reads the sensor-related information recorded on the recording unit 194 in association with the vehicle identification information on the basis of the vehicle identification information supplied from the image analysis unit 192.

Further, as for the sensor-related information of the vehicle 11, the sensor-related information acquisition unit 193 reads the sensor-related information recorded on the recording unit 194 in association with the vehicle identification information on the basis of the vehicle identification information of the vehicle 11 supplied from the communication unit 191.

The sensor-related information acquisition unit 193 supplies the sensor-related information of the vehicle 11 and the sensor-related information of the preceding vehicle that have been obtained in this manner to the safety determination unit 231.

In step S194, the information acquisition unit 232 acquires environment information on the basis of the host-vehicle position information supplied from the communication unit 191.

That is, the information acquisition unit 232 supplies the host-vehicle position information supplied from the communication unit 191 to the communication unit 233, and the communication unit 233 transmits the host-vehicle position information supplied from the information acquisition unit 232 to the external server or the like via the communication network.

Then, in response to the transmission of the host-vehicle position information, the external server or the like transmits the environment information indicating the environment in the surroundings of the position indicated by the host-vehicle position information to the server 221. The communication unit 233 receives the environment information transmitted from the external server or the like and supplies the received environment information to the information acquisition unit 232. The information acquisition unit 232 supplies the environment information supplied from the communication unit 233 to the safety determination unit 231.

In step S195, the safety determination unit 231 determines the safety of the preceding vehicle on the basis of the sensor-related information of the vehicle 11 and the sensor-related information of the preceding vehicle that have been supplied from the sensor-related information acquisition unit 193 and the environment information supplied from the information acquisition unit 232.

For example, a process similar to the process in step S14 in FIG. 4 is performed in step S195 to determine the safety of the preceding vehicle. The safety determination unit 231 supplies the result of the determination of the safety obtained in this manner to the communication unit 191.

In step S196, the communication unit 191 transmits the result of the determination of the safety supplied from the safety determination unit 231 to the vehicle 11 via the communication network, and the safety determination process ends.

Further, when the result of the determination of the safety is transmitted from the server 221 to the vehicle 11, the communication unit 25 in the vehicle 11 receives the result of the determination of the safety transmitted from the server 221 and supplies the result to the control unit 141 in step S165.

After the result of the determination of the safety of the preceding vehicle ahead of the vehicle 11 is obtained in this manner, the driving control process ends following processes in steps S166 and S167. Since these processes are similar to the processes in steps S15 and S16 in FIG. 4, the description thereof is omitted.

As above, the vehicle 11 transmits the front image, the host-vehicle position information, and the vehicle identification information of the host vehicle to the server 221 and receives the result of the determination of the safety from the server 221 to control driving of the host vehicle on the basis of the result of the determination of the safety that has been received. Further, the server 221 determines safety using the front image, the host-vehicle position information, and the vehicle identification information that have been received from the vehicle 11.

In this manner, even in a case where the server 221 determines safety, it is possible to perform more appropriate control in consideration of the information related to the safety-function sensor of the preceding vehicle and the surrounding environment, thereby improving the safety.

<Example of Configuration of Computer>

Incidentally, the above-described series of processes can be executed by hardware or software. In a case where the series of processes are to be executed by software, a program constituting the software is installed in a computer. Here, examples of the computer include a computer incorporated in dedicated hardware, a general-purpose personal computer, for example, capable of executing various kinds of functions with various kinds of programs installed therein, and the like.

Figure 12:
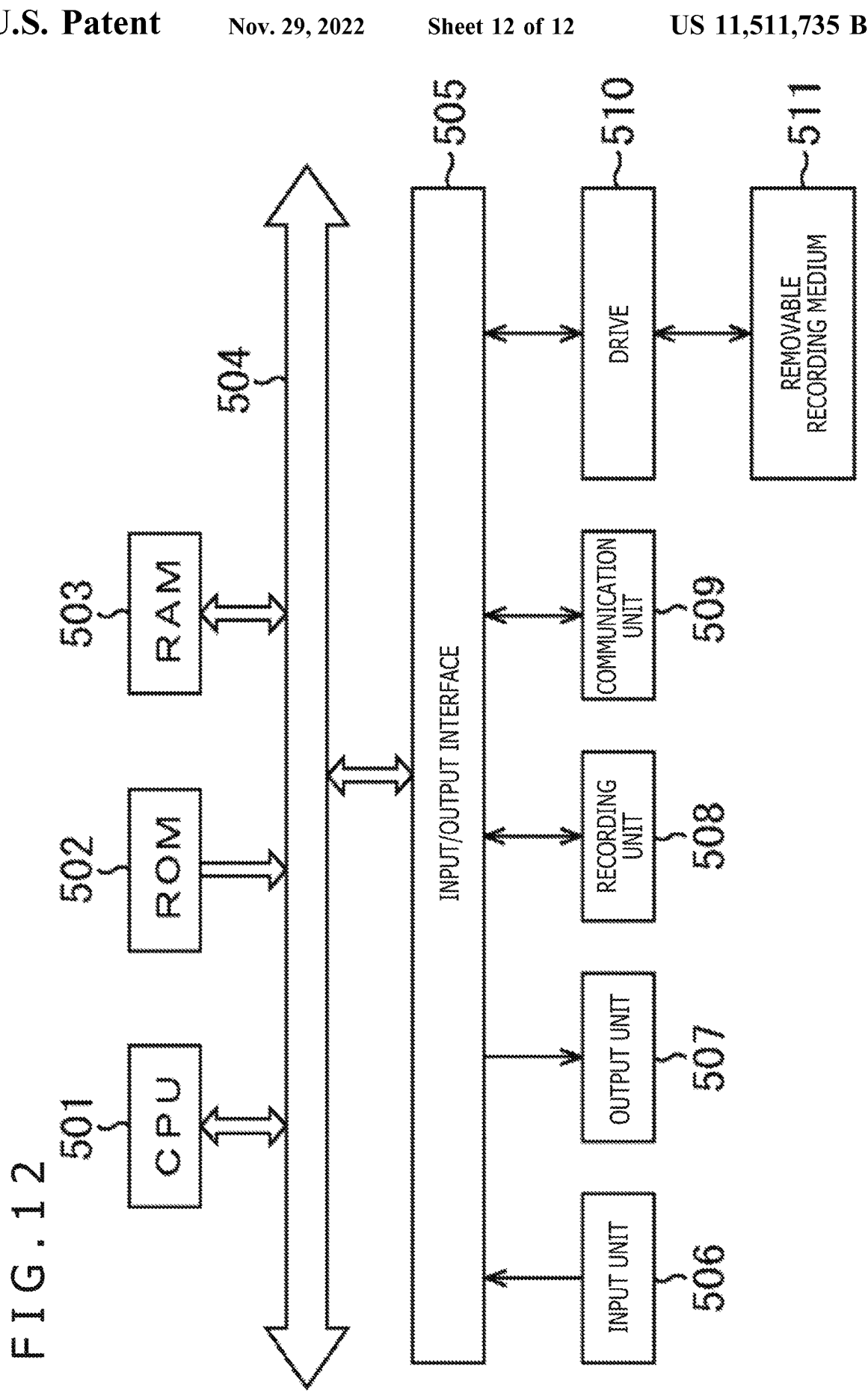
FIG. 12 is a diagram illustrating an example of a configuration of a computer.

FIG. 12 is a block diagram illustrating an example of a configuration of hardware of a computer in which a program executes the series of processes described above.

In the computer, a CPU (Central Processing Unit) 501, a ROM (Read Only Memory) 502, and a RAM (Random Access Memory) 503 are interconnected to each other via a bus 504.

Moreover, an input/output interface 505 is connected to the bus 504. An input unit 506, an output unit 507, a recording unit 508, a communication unit 509, and a drive 510 are connected to the input/output interface 505.

The input unit 506 includes a keyboard, a mouse, a microphone, an imaging element, and the like. The output unit 507 includes a display, a speaker, and the like. The recording unit 508 includes a hard disk, a nonvolatile memory, and the like. The communication unit 509 includes a network interface and the like. The drive 510 drives a removable recording medium 511 such as a magnetic disk, an optical disc, a magneto-optical disk, or a semiconductor memory.

In the computer configured as described above, for example, the CPU 501 loads the program, which is recorded on the recording unit 508, into the RAM 503 via the input/output interface 505 and the bus 504 and executes the program, through which the above-described series of processes are performed.

The program executed by the computer (the CPU 501) can be provided by recording the program on the removable recording medium 511 as a package medium or the like, for example. Further, the program can be provided via a wired or wireless transmission medium such as a local area network, the Internet, or digital satellite broadcasting.

In the computer, the program can be installed in the recording unit 508 through the input/output interface 505 by attaching the removable recording medium 511 to the drive 510. Further, the program can be received by the communication unit 509 via a wired or wireless transmission medium and installed in the recording unit 508. In addition, the program can be installed in advance in the ROM 502 or the recording unit 508.

It is noted that the program executed by the computer may be a program that performs processes in chronological order in the order described in the present specification or a program that performs processes in parallel or at necessary timings on occasions of calls or the like.

Further, the embodiments of the present technology are not limited to the embodiments described above, and various modifications can be made without departing from the scope of the present technology.

For example, the present technology can be configured as cloud computing in which one function is shared and processed collaboratively among a plurality of apparatuses via a network.

Further, each of the steps described in the flowcharts described above can be executed not only by one apparatus, but also by a plurality of apparatuses in a shared manner.

Moreover, in a case where one step includes a plurality of processes, the plurality of processes included in this one step can be executed not only by one apparatus or but also by a plurality of apparatuses in a shared manner.

Moreover, the present technology may also have the following configurations.

(1)

A signal processing apparatus including:

a safety determination unit configured to determine safety of a preceding vehicle on a basis of sensor-related information related to a sensor provided in the preceding vehicle, the sensor being relevant to a safety function; and a control signal generation unit configured to generate, on a basis of a result of the determination of the safety, a control signal for controlling a host vehicle.

(2)

The signal processing apparatus according to (1), in which the sensor-related information includes information indicating a type of the sensor.

(3)

The signal processing apparatus according to (1) or (2), in which the sensor-related information includes sensor output information obtained by the sensor.

(4)

The signal processing apparatus according to (3), in which the sensor output information includes distance information measured by the sensor or image information captured by the sensor.

(5)

The signal processing apparatus according to any one of (1) to (4), in which the safety determination unit determines the safety of the preceding vehicle on a basis of the sensor-related information of the preceding vehicle and sensor-related information of a sensor provided in the host vehicle.

(6)

The signal processing apparatus according to (5), in which the safety determination unit determines the safety of the preceding vehicle on a basis of environment information indicating an environment in surroundings of the preceding vehicle, the sensor-related information of the preceding vehicle, and the sensor-related information of the host vehicle.

(7)

The signal processing apparatus according to (5) or (6), in which in a case where capability of the sensor of the preceding vehicle is higher than capability of the sensor of the host vehicle, the control signal generation unit generates the control signal on a basis of sensor output information obtained by the sensor of the preceding vehicle.

(8)

The signal processing apparatus according to any one of (1) to (7), in which the control signal includes a control signal for a collision warning, a control signal for following the preceding vehicle, a control signal for controlling braking, or a control signal for controlling a following distance between the preceding vehicle and the host vehicle.

(9)

The signal processing apparatus according to any one of (1) to (8), in which
the sensor includes at least one of a radar, a camera, a lidar, or an ultrasonic sensor.

(10)

The signal processing apparatus according to any one of (1) to (9), further including:
a communication unit configured to receive the sensor-related information of the preceding vehicle by communicating with the preceding vehicle.

(11)

The signal processing apparatus according to any one of (1) to (9), further including;
a communication unit configured to transmit, to a server, an image including at least a part of the preceding vehicle as a subject and receive the sensor-related information of the preceding vehicle transmitted from the server in response to the transmission of the image.

(12)

The signal processing apparatus according to (11), in which
the sensor-related information transmitted from the server is associated with vehicle identification information that is related to the preceding vehicle and that is obtained by performing image analysis on the image.

(13)

The signal processing apparatus according to (12), in which
the vehicle identification information includes at least one of a type, a model, or a license number of a vehicle.

(14)

A signal processing method including:
by a signal processing apparatus,
determining safety of a preceding vehicle on a basis of sensor-related information related to a sensor provided in the preceding vehicle, the sensor being relevant to a safety function; and
generating, on a basis of a result of the determination of the safety, a control signal for controlling a host vehicle.

(15)

A program causing a computer to execute a process including the steps of:
determining safety of a preceding vehicle on a basis of sensor-related information related to a sensor provided in the preceding vehicle, the sensor being relevant to a safety function; and
generating, on a basis of a result of the determination of the safety, a control signal for controlling a host vehicle.

(16)

A signal processing apparatus including:
a safety determination unit configured to determine safety of a preceding vehicle preceding a predetermined vehicle on a basis of sensor-related information related to a sensor provided in the preceding vehicle, the sensor being relevant to a safety function; and
a communication unit configured to transmit a result of the determination of the safety to the predetermined vehicle.

(17)

The signal processing apparatus according to (16), in which
the sensor-related information includes information indicating a type of the sensor.

(18)

The signal processing apparatus according to (16) or (17), in which
the safety determination unit determines the safety of the preceding vehicle on a basis of the sensor-related information of the preceding vehicle and sensor-related information of a sensor provided in the predetermined vehicle.

(19)

The signal processing apparatus according to (18), in which
the safety determination unit determines the safety of the preceding vehicle on a basis of environment information indicating an environment in surroundings of the preceding vehicle, the sensor-related information of the preceding vehicle, and the sensor-related information of the predetermined vehicle.

(20)

The signal processing apparatus according to (19), further including:
an image analysis unit configured to perform image analysis on an image including at least a part of the preceding vehicle as a subject, in which
the safety determination unit determines the safety of the preceding vehicle on a basis of the sensor-related information associated with vehicle identification information that is related to the preceding vehicle and that is obtained by performing the image analysis, the sensor-related information of the predetermined vehicle, and the environment information.

(21)

The signal processing apparatus according to (20), in which
the vehicle identification information includes at least one of a type, a model, or a license number of a vehicle.

(22)

The signal processing apparatus according to (21), in which
the communication unit receives the image and the vehicle identification information of the predetermined vehicle from the predetermined vehicle, and
the safety determination unit determines the safety of the preceding vehicle on a basis of the sensor-related information associated with the vehicle identification information of the preceding vehicle obtained by performing the image analysis, the sensor-related information associated with the vehicle identification information of the predetermined vehicle, and the environment information.

(23)

The signal processing apparatus according to (22), in which
the communication unit receives position information indicating a position of the predetermined vehicle form the predetermined vehicle, and
the safety determination unit determines the safety of the preceding vehicle on a basis of the sensor-related information of the preceding vehicle, the sensor-related information of the predetermined vehicle, and the environment information acquired on a basis of the position information.

(24)

A signal processing method including:
by a signal processing apparatus,
determining safety of a preceding vehicle preceding a predetermined vehicle on a basis of sensor-related information related to a sensor provided in the preceding vehicle, the sensor being relevant to a safety function; and
transmitting a result of the determination of the safety to the predetermined vehicle.

(25)

A program causing a computer to execute a process including the steps of:

determining safety of a preceding vehicle preceding a predetermined vehicle on a basis of sensor-related information related to a sensor provided in the preceding vehicle, the sensor being relevant to a safety function; and transmitting a result of the determination of the safety to the predetermined vehicle.

(26)

A signal processing apparatus including:

a communication unit configured to transmit, to a server, an image including at least a part of a preceding vehicle as a subject and receive a result of determination of safety of the preceding vehicle transmitted from the server in response to the transmission of the image, the result of the determination of the safety of the preceding vehicle being determined on a basis of sensor-related information related to a sensor provided in the preceding vehicle, the sensor being relevant to a safety function; and a control signal generation unit configured to generate, on a basis of the result of the determination of the safety, a control signal for controlling a host vehicle.

(27)

The signal processing apparatus according to (26), in which the communication unit receives the result of the determination of the safety of the preceding vehicle determined on a basis of the sensor-related information associated with vehicle identification information that is related to the preceding vehicle and that is obtained by performing image analysis on the image.

(28)

The signal processing apparatus according to (27), in which the vehicle identification information includes at least one of a type, a model, and a license number of a vehicle.

(29)

The signal processing apparatus according to (27) or (28), in which the communication unit further transmits, to the server, vehicle identification information related to the host vehicle and receives the result of the determination of the safety of the preceding vehicle determined on a basis of sensor-related information associated with the vehicle identification information related to the host vehicle and the sensor-related information of the preceding vehicle.

(30)

The signal processing apparatus according to (29), in which the communication unit further transmits, to the server, position information indicating a position of the host vehicle and receives the result of the determination of the safety of the preceding vehicle determined on a basis of environment information indicating an environment in surroundings of the position indicated by the position information, the sensor-related information of the host vehicle, and the sensor-related information of the preceding vehicle.

(31)

A signal processing method including:

by a signal processing apparatus, transmitting, to a server, an image including at least a part of a preceding vehicle as a subject;

receiving a result of determination of safety of the preceding vehicle transmitted from the server in response to the transmission of the image, the result of the determination of the safety of the preceding vehicle being determined on a basis of sensor-related information related to a sensor provided in the preceding vehicle, the sensor being relevant to a safety function; and generating, on a basis of the result of the determination of the safety, a control signal for controlling a host vehicle.

(32)

A program causing a computer to execute a process including the steps of:

transmitting, to a server, an image including at least a part of a preceding vehicle as a subject;

receiving a result of determination of safety of the preceding vehicle transmitted from the server in response to the transmission of the image, the result of the determination of the safety of the preceding vehicle being determined on a basis of sensor-related information related to a sensor provided in the preceding vehicle, the sensor being relevant to a safety function; and generating, on a basis of the result of the determination of the safety, a control signal for controlling a host vehicle.

REFERENCE SIGNS LIST

11 Vehicle, 24 Display unit, 25 Communication unit, 141 Control unit, 151 Information acquisition unit, 152 Safety determination unit, 153 Control signal generation unit

The invention claimed is:

1. A signal processing apparatus, comprising:
a safety determination unit configured to determine safety of a preceding vehicle based on sensor-related information related to a sensor in the preceding vehicle, wherein the sensor is related to a safety function of the preceding vehicle;
a control signal generation unit configured to generate, based on a result of the determination of the safety, a control signal to control a host vehicle.

2. The signal processing apparatus according to claim 1, wherein the sensor-related information includes information indicating a type of the sensor.

3. The signal processing apparatus according to claim 1, wherein the sensor-related information includes sensor output information obtained by the sensor.

4. The signal processing apparatus according to claim 3, wherein the sensor output information includes at least one of distance information measured by the sensor or image information captured by the sensor.

5. The signal processing apparatus according to claim 1, wherein the safety determination unit is further configured to determine the safety of the preceding vehicle based on the sensor-related information of the preceding vehicle and sensor-related information of a sensor in the host vehicle.

6. The signal processing apparatus according to claim 5, wherein the safety determination unit is further configured to determine the safety of the preceding vehicle based on environment information indicating an environment in surroundings of the preceding vehicle, the sensor-related information of the preceding vehicle, and the sensor-related information of the host vehicle.

7. The signal processing apparatus according to claim 5, wherein
in a case where capability of the sensor of the preceding vehicle is higher than capability of the sensor of the host vehicle, the control signal generation unit is further configured to generate the control signal based on sensor output information obtained by the sensor of the preceding vehicle.

8. The signal processing apparatus according to claim 1, wherein the control signal includes one of a control signal for a collision warning, a control signal for following the preceding vehicle, a control signal for controlling braking, or a control signal for controlling a following distance between the preceding vehicle and the host vehicle.

9. The signal processing apparatus according to claim 1, wherein the sensor includes at least one of a radar, a camera, a lidar, or an ultrasonic sensor.

10. The signal processing apparatus according to claim 1, further comprising
a communication unit configured to receive the sensor-related information of the preceding vehicle based on communication with the preceding vehicle.

11. The signal processing apparatus according to claim 1, further comprising
a communication unit configured to:
transmit, to a server, an image including at least a part of the preceding vehicle as a subject; and
receive the sensor-related information of the preceding vehicle transmitted from the server in response to the transmission of the image.

12. The signal processing apparatus according to claim 11, wherein
the sensor-related information transmitted from the server is associated with vehicle identification information that is related to the preceding vehicle and the vehicle identification information of the preceding vehicle is obtained by performing image analysis on the image.

13. The signal processing apparatus according to claim 12, wherein the vehicle identification information includes at least one of a type, a model, or a license number of the preceding vehicle.

14. A signal processing method, comprising:
in a signal processing apparatus,
determining safety of a preceding vehicle based on sensor-related information related to a sensor in the preceding vehicle, wherein the sensor is related to a safety function of the preceding vehicle;
generating, based on a result of the determination of the safety, a control signal for controlling a host vehicle.

15. A non-transitory computer-readable medium having stored thereon, computer-executable instructions which, when executed by a computer, cause the computer to execute operations, the operations comprising:
determining safety of a preceding vehicle based on sensor-related information related to a sensor in the preceding vehicle, wherein the sensor is related to a safety function of the preceding vehicle;
generating, based of a result of the determination of the safety, a control signal to control a host vehicle.

* * * * *